(12) United States Patent
Schönleber et al.

(10) Patent No.: US 11,027,364 B2
(45) Date of Patent: Jun. 8, 2021

(54) METHOD AND DEVICE FOR MEASURING THE DEPTH OF THE VAPOR CAPILLARY DURING A MACHINING PROCESS WITH A HIGH-ENERGY BEAM

(71) Applicant: PRECITEC OPTRONIK GMBH, Neu-Isenburg (DE)

(72) Inventors: Martin Schönleber, Aschaffenburg (DE); Christoph Dietz, Obertshausen (DE)

(73) Assignee: PRECITEC OPTRONIK GMBH, Neuisenburg (DE)

( * ) Notice: Subject to any disclaimer, the term of this patent is extended or adjusted under 35 U.S.C. 154(b) by 320 days.

(21) Appl. No.: 16/095,299

(22) PCT Filed: Oct. 19, 2016

(86) PCT No.: PCT/EP2016/075112
§ 371 (c)(1),
(2) Date: Oct. 19, 2018

(87) PCT Pub. No.: WO2017/182107
PCT Pub. Date: Oct. 26, 2017

(65) Prior Publication Data
US 2019/0091798 A1  Mar. 28, 2019

(30) Foreign Application Priority Data
Apr. 22, 2016  (DE) .......................... 102016005021.7

(51) Int. Cl.
*B23K 26/03* (2006.01)
*G01B 9/02* (2006.01)
(Continued)

(52) U.S. Cl.
CPC ............ *B23K 26/032* (2013.01); *B23K 26/03* (2013.01); *B23K 26/048* (2013.01);
(Continued)

(58) Field of Classification Search
CPC .... B23K 26/03; B23K 26/032; B23K 26/048; B23K 26/0643; B23K 26/0648;
(Continued)

(56) References Cited

U.S. PATENT DOCUMENTS 5,869,805 A  2/1999 Beyer et al.
8,410,392 B2  4/2013 Kogel-Hollacher et al.
(Continued)

FOREIGN PATENT DOCUMENTS

DE  4434409  4/1996
DE  102010016862  9/2011
(Continued)

OTHER PUBLICATIONS

DE Office Action 12212016, Office Action cited in the corresponding German Application No. 102016005021.7; dated Dec. 21, 2016; 12 pages, DE.
(Continued)

*Primary Examiner* — Dana Ross
*Assistant Examiner* — Joseph W Iskra
(74) *Attorney, Agent, or Firm* — Lempia Summerfield Katz LLC

(57) ABSTRACT

A method for measuring the depth of the vapour cavity during an industrial machining process employs a high-energy beam. An optical measuring beam is directed towards the base of a vapour cavity. An optical coherence tomograph generates interference factors or other raw measurement data from reflections of the measurement beam. An evaluation device generates undisturbed measurement data, wherein raw measurement data that is generated at different times is processed together in the course of a mathematical operation. This operation can be a subtraction or a division. Slowly changing interference factors can thus be eliminated. An end value for the distance to the base of the vapour cavity
(Continued)

is calculated from the undisturbed measurement data using a filter. As a result, the depth of the vapour cavity can be determined, in the knowledge of the distance at a part of the surface of the work piece that is not exposed to the high-energy beam.

20 Claims, 10 Drawing Sheets

(51) Int. Cl.
G01B 11/22 (2006.01)
B23K 26/04 (2014.01)
B23K 26/08 (2014.01)
B23K 26/21 (2014.01)
B23K 26/06 (2014.01)

(52) U.S. Cl.
CPC ...... *B23K 26/0643* (2013.01); *B23K 26/0648* (2013.01); *B23K 26/0665* (2013.01); *B23K 26/0884* (2013.01); *B23K 26/21* (2015.10); *G01B 9/02019* (2013.01); *G01B 9/02044* (2013.01); *G01B 9/02083* (2013.01); *G01B 9/02091* (2013.01); *G01B 11/22* (2013.01); *G01B 2290/65* (2013.01)

(58) Field of Classification Search
CPC ............... B23K 26/0665; B23K 26/0884; B23K 26/21; G01B 11/22; G01B 2290/65; G01B 9/02044; G01B 9/02083; G01B 9/02091; G01B 9/02019
USPC ..................................................... 219/121.83
See application file for complete search history.

(56) References Cited

U.S. PATENT DOCUMENTS

| 8,982,339 B2 | 3/2015 | Schonleber et al. |
| 2012/0138586 A1 | 6/2012 | Webster et al. |
| 2016/0039045 A1 | 2/2016 | Webster |
| 2016/0202045 A1 | 7/2016 | Schonleber et al. |

FOREIGN PATENT DOCUMENTS

| DE | 102014007074 | | 10/2015 |
| EP | 1977850 | | 10/2008 |
| WO | 2015039741 | | 3/2015 |
| WO | WO2015039741 | * | 3/2015 |

OTHER PUBLICATIONS

International Search Report cited in the corresponding PCT application No. PCT/EP2016/075112; dated Jan. 25, 2017; 17 pages.

* cited by examiner

US 11,027,364 B2

METHOD AND DEVICE FOR MEASURING THE DEPTH OF THE VAPOR CAPILLARY DURING A MACHINING PROCESS WITH A HIGH-ENERGY BEAM

RELATED APPLICATION DATA

This application is a U.S. national stage of and claims priority benefit to prior filed international application no. PCT/EP2016/075112, filed Oct. 19, 2016, and which claims priority to German national application no. 10 2016 005 021.7, filed Apr. 22, 2016. The entire contents of these prior filed applications are hereby incorporated by reference herein.

BACKGROUND OF THE INVENTION

1. Scope of the Invention

The invention relates to a method and a device for measuring the depth of the vapor capillary during a process in which workpieces are welded with a laser beam, an electron beam or another high-energy beam, provided with holes or processed in any other way. In particular, the invention relates to the mathematical evaluation of the measurement data generated by an optical coherence tomograph and superimposed by interferences.

2. Description of the Prior Art

Laser processing devices usually comprise a laser radiation source, which may be, for example, a fiber laser or a disk laser, and a machining head that focuses the laser beam generated by the laser beam source in a focal spot. The machining head may be attached to a movable robotic arm or other traveling device that allows positioning in all three spatial directions. Sometimes the machining head is fixed in space, and the workpieces are delivered by means of a handling device.

A problem that was previously unsatisfactorily solved when welding or drilling with the aid of laser beams, was keeping the penetration depth of the laser beam at the desired setpoint as accurately as possible. The penetration depth is the axial extent of the vapor capillary that is generated by the laser beam in the workpiece. Only when the penetration depth reaches its setpoint may the desired machining result be obtained. For example, if the penetration depth is not deep enough when welding two metal sheets, there is no, or only incomplete, welding of the two sheets. On the other hand, if the penetration depth is too deep, this may lead to welding through.

Undesirable variations in the penetration depth may occur for different reasons. For example, in the course of laser machining, the protective screen, which protects the optical elements in the machining head from splashes and other dirt, absorbs an increasing part of the laser radiation, wherein the penetration depth decreases. In addition, inhomogeneities in the workpieces or variations in the travel speed may cause the penetration depth to change locally and thus deviate from its setpoint.

The measurement of the depth of the vapor capillary presents a significant challenge because very difficult measuring conditions prevail within the vapor capillary. The vapor capillary is not only very small and extremely thermally bright, it also generally changes its shape during machining.

Comparable problems also arise when machining workpieces with electron beams or other high-energy beams.

EP 1 977 850 A1, DE 102010016862 B3, US 2012/0138586 A1 and US 2016/0039045 A1 describe methods in which the penetration depth of the laser beam during laser machining is measured with the aid of an optical coherence tomograph (OCT). Optical coherence tomography enables a highly accurate and contactless optical distance measurement even in the vicinity of the thermally very bright vapor capillary.

WO 2015/039741 A1 discloses a method, which is optimised especially for the measurement of the penetration depth. An optical coherence tomograph generates a first measuring beam which is directed to the bottom of the vapor capillary. At the same time, a second measuring beam is directed to a second measuring point which is located on the workpiece outside the vapor capillary. Preferably, this second measuring beam scans the surface of the workpiece like a scanner. The penetration depth of the laser beam then results as the difference between the distances measured with the aid of the two measuring beams.

One problem with such measurements is that the coherence tomographs provide a lot of measurement data from which the desired information must be filtered out. Significant problems arise in this case with respect to interferences, which partially cover the actually desired measurement signals.

SUMMARY OF THE INVENTION

The object of the invention is to provide a method and a device with which the depth of the vapor capillary may be reliably and accurately determined during a machining process with a high-energy beam despite interferences.

A method according to the invention that achieves this object comprises the following steps:
a) directing an optical measuring beam to the bottom of a vapor capillary, which results in a region of interaction between a workpiece and the high energy beam;
b) detecting reflections of the measuring beam in an optical coherence tomograph;
c) generating raw measurement data from the reflections detected in the optical coherence tomograph,
d) repeating steps a) to c) at multiple times $t_i$, where i=1,2,3, . . . , during the machining process, wherein a set of raw measurement data for a first distance to the bottom of the vapor capillary are obtained for each time $t_i$;
e) calculating a set of undisturbed measurement data for a time $t_n$ by generating a first set of raw measurement data generated at the time $t_n$, and a second set of raw measurement data generated at an earlier time $t_m$, where m<n, were processed together by means of a mathematical operation;
f) calculating a final value for the first distance at the time $t_n$ from the set of undisturbed measurement data calculated in step e);
g) measuring a second distance to a part of the surface of the workpiece that is not exposed to the high energy beam;
h) calculating the depth of the vapor capillary by subtracting the second distance from the first distance final value calculated in step f).

The inventors realised that common mathematical processing of the current raw measurement data with raw measurement data that was generated at an earlier time, interferences that typically affect the measurement of the depth of the vapor capillary may be largely eliminated. This is based on the knowledge that the interfering influences usually do not change, or change only comparatively slowly, during the machining process. As a result, the interference between two successive measurement times has practically the same effect on the raw measurement data. With suitable mathematical operations, e.g. a complete or partial subtraction, then the unwanted interference may be largely eliminated. If the raw measurement data is present as spectra, then this mathematical operation may also be a division.

In one embodiment, the set of raw measurement data generated since the earlier time $t_m$ is at least partially subtracted from the set of raw measurement data generated at time $t_n$ by the mathematical operation in step e). For example, in the case of the coherence tomographs preferred here, wherein the distance values are coded in the spectrum of the reflected light (Spectral Domain, SD OCT), the measured spectra may be subtracted from one another.

It is often favorable in the case of a subtraction, if an immediately preceding time $t_{n-1}$ is selected as the earlier time. Since the measurements are usually clocked with a given measurement frequency, there is an immediately preceding time $t_{n-1}$ (except for the first time $t_o$) at each time $t_n$. Such a choice is advantageous because it minimises the probability that the influence of the disturbance on the raw measurement data will have changed between the immediately adjacent times $t_n$ and $t_{n-1}$.

In principle, it is possible that the raw measurement data generated at the earlier time $t_m$ is not completely, but only partially, e.g. 99.9%, subtracted. In this way, for example, weakening interference may be taken into account during the measurement. This corresponds to the multiplication of the raw measurement data with a factor IgI<1. As a complete subtraction, a subtraction is also considered here, wherein the raw measurement data generated at the earlier time are previously multiplied by a factor IgI>1, in order to into take account an increasing interference in the course of the measurement. The factor g may also change in the course of the machining process.

In a preferred embodiment, the mathematical operation in step e) at least partially subtracts from the set of raw measurement data generated at time $t_n$, a moving average calculated from sets of raw measurement data that were generated at several earlier times $t_j$, where j≤m. In this way, the effect of faster-changing interferences may be effectively eliminated, since a trend in the course of the interference results from the change in the moving average.

The moving average may be a weighted average of at least the order 2. Orders of 3 or more are usually not required.

The average may also be an exponentially smoothed average that captures all previous times with progressively weaker weight. This makes it even more effective in the elimination of the influence of faster-changing interferences.

In the case of the coherence tomograph used, the distance values are preferably coded in the course of the interferometer phase as a function of the frequency of the reflected light. Such coherence tomographs are commonly referred to as FD OCT, wherein FD stands for Fourier Domain.

This type of coherence tomograph also includes the above-mentioned SD OCT, in which the invention may be used particularly advantageously. The set of raw measurement data is represented in such a coherence tomograph by an interference spectrum generated by the optical coherence tomograph. The distance values result from the inverse Fourier transforms of the (usually previously equalised) spectra.

Alternatively, the coherence tomograph may also be designed as a swept-source coherence tomograph (SS OCT), which also belongs to the FD OCT group. In an SS OCT, the wavelength of a narrowband light source is quickly tuned. Thus, an SS OCT does not require a spectrograph, but only a single photosensitive element that sequentially captures the spectral components. The spectral components may be joined to form an interference spectrum as generated by an SD OCT.

In particular, when the raw measurement data are spectra, in the mathematical operation in step e), the interference spectrum generated by the FD coherence tomograph at time $t_n$ may be divided by an average spectrum which is an average of several interference spectra, which were generated at earlier times $t_j$, where j≤m. Such a division performed before the inverse Fourier transform also effectively eliminates the influence of slowly varying interferences. By averaging, there is a smearing of the high-frequency components. What remains is only the low-frequency interference component, which divides the currently measured interference spectrum.

The more interference spectra that contribute to the average value, the better is the smearing of the high-frequency components. It is therefore favorable if the interference spectra contribute to the moving average of 50 to 200 earlier times.

According to the method of the invention, the interference spectra may be subjected to an inverse Fourier transform in a manner known per se. In this way, at least one distance value is obtained for each interference spectrum. From several distance values, the final value for the first distance at time $t_n$ is then calculated according to a predetermined criterion.

For example, this criterion may be a quantile criterion. A quantile is a threshold that has the property that a certain proportion of the values is smaller than this value while the remaining proportion of the values is greater than this threshold. In particular, for the measurement of the vapor capillary, such a quantile filter has proven to be suitable, since only the largest distance values correctly reproduce the distance to the bottom of the vapor capillary.

In principle, the second distance to the surface of the workpiece may be determined with any measurement method. Tactile measurements as well as contactless measurements with the help of sound or electromagnetic waves are possible.

However, it is particularly simple if, in step g), the second distance is measured by directing another measuring beam onto that part of the surface of the workpiece which is not exposed to the high-energy beam. Reflections from the other measuring beam are then detected in the same or another coherence tomograph. The raw measurement data for the second distance may be processed in the same way as the raw measurement data for the first distance. In many cases, however, it is better to process the raw measurement data for the two distances in different ways. In the determination of the first distance, for example, a quantile filter may be used, while the second distance may be derived from parameters of a fitted distribution function.

In principle, it is possible to provide two independent coherence tomographs in order to measure the two distances independently. However, it is simpler if an original measuring beam is split into the measuring beam and the further measuring beam. When evaluating the raw measurement data, both values are then obtained simultaneously for the first distance and for the second distance. For the distribution of the original measuring beam, any optical elements may be used, which make it possible to spatially divide an incident light beam. Such an optical element may be, for example, designed as a polarisation-selective and non-polarisation-selective beam splitter. In the simplest case, a prism is used which has two mutually-inclined optical surfaces. If the original measuring beam is directed onto the prism so that it strikes both optical surfaces, the original measuring beam is refracted differently at the optical surfaces and is divided. If such a prism is rotated or moved in any other way and arranged so that a surface of the prism does not change its orientation during movement, it may be achieved that a measuring beam with fixed direction remains directed into the vapor capillary, while the other measuring beam scans the surface of the workpiece outside the vapor capillary.

With regard to the device, the object stated at the outset is achieved by a device for measuring the depth of the vapor capillary during a machining process with a high-energy beam, wherein the device comprises:
- an optical coherence tomograph that is designed to perform the following steps:
  - a) directing an optical measuring beam to the bottom of a vapor capillary, which results in a region of interaction between a workpiece and the high energy beam;
  - b) detecting reflections of the measuring beam in the optical coherence tomograph;
  - c) generating raw measurement data from the reflections detected in the optical coherence tomograph,
  - d) repeating steps a) to c) at several times $t_i$, where i=1, 2, 3, ..., during the machining process, wherein for each time $t_i$ a set of raw measurement data is obtained for a first distance to the bottom of the vapor capillary;
- an evaluation device that is set up to carry out the following steps:
  - e) calculating a set of undisturbed measurement data for a time $t_n$ by generating a first set of raw measurement data at the time $t_n$ and a second set of raw measurement data generated at an earlier time $t_m$, where m<n, wherein they were processed together by means of a mathematical operation;
  - f) calculating a final value for the first distance at time $t_n$ from the set of undisturbed measurement data calculated in step e);
  - g) calculating the depth of the vapor capillary by subtracting a measured second distance to a part of the surface of the workpiece not exposed to the high energy beam from the first distance end value calculated in step f):

The advantageous embodiments explained for the method are correspondingly applicable to the device according to the invention.

BRIEF DESCRIPTION OF THE DRAWINGS

Embodiments of the invention will be explained in more detail with reference to the drawings, wherein.

DESCRIPTION OF PREFERRED EMBODIMENTS

1. Structure of the Laser Machining Apparatus

Figure 1:
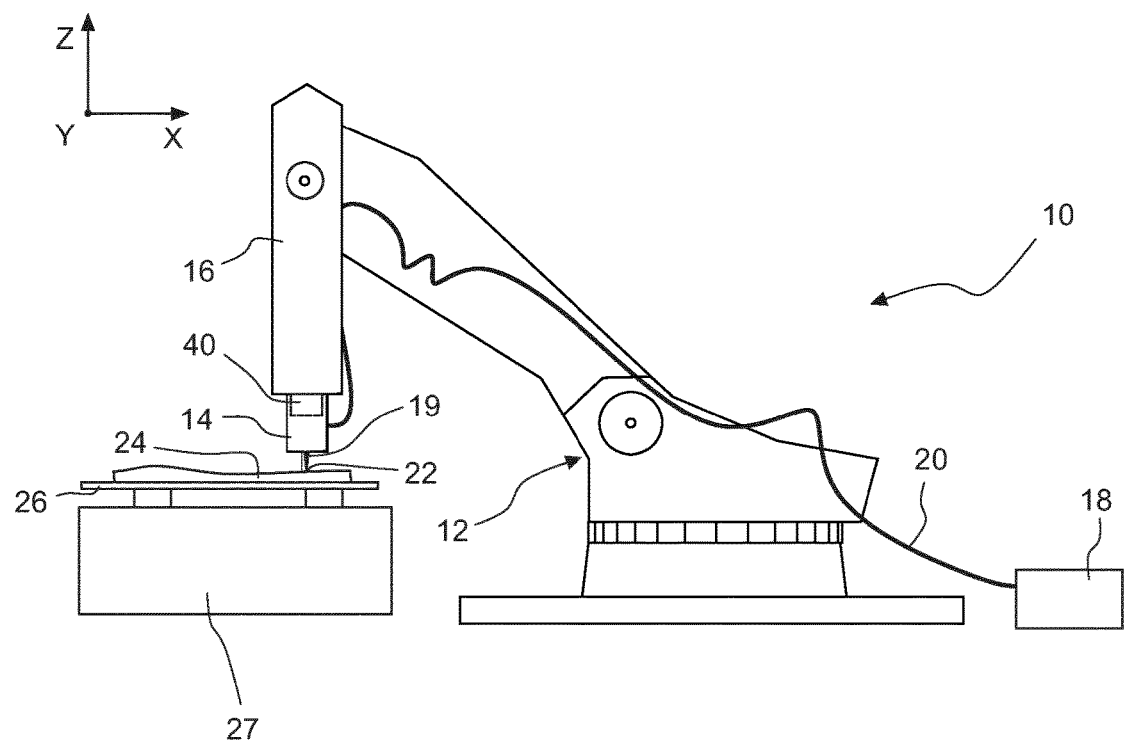
FIG. 1 shows a schematic representation of a laser machining apparatus according to the invention when welding two workpieces.

FIG. 1 shows a schematic representation of an exemplary embodiment of a laser machining apparatus 10 according to the invention, wherein it comprises a robot 12 and a machining head 14 which is fastened to a movable arm 16 of the robot 12.

The laser machining apparatus 10 also includes a laser radiation source 18, which is in the form of a disk laser or fiber laser in the illustrated embodiment. The laser beam 19 generated by the laser radiation source 18 is supplied via an optical fiber 20 to the machining head 14 and focused by the latter in a focal spot 22.

In the illustrated embodiment, the laser machining apparatus 10 is to be used to weld a first metallic workpiece 24 of varying thickness to a second metallic workpiece 26 mounted on a workpiece holder 27. The focal spot 22 produced by the machining head 14 therefore has to be precisely positioned in the vicinity of the transition between the first workpiece 24 and the second workpiece 26.

Figure 2:
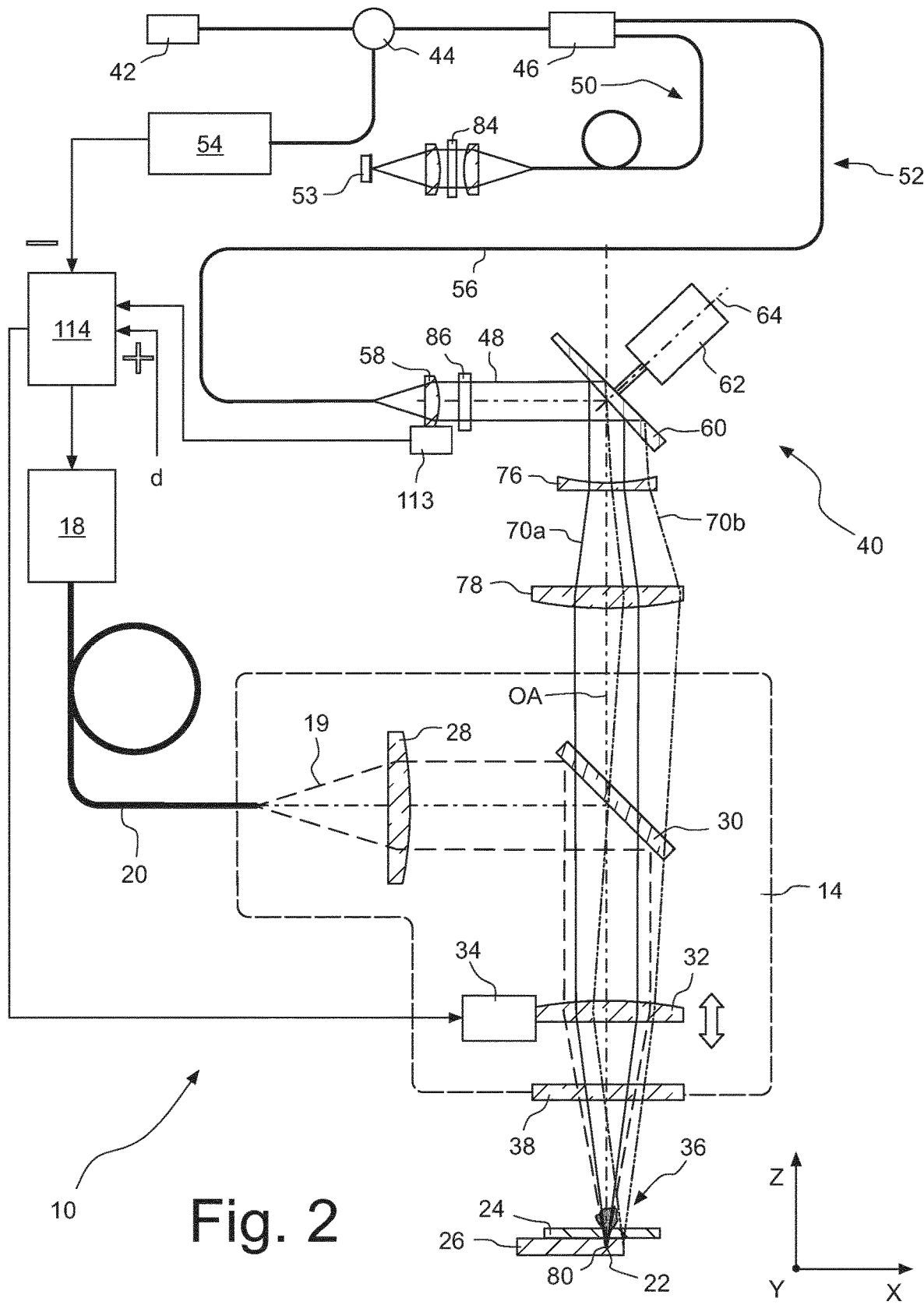
FIG. 2 shows the internal structure of the laser processing apparatus shown in a schematic representation in FIG. 1.

FIG. 2 shows a schematic representation of the internal structure of the optical components of the laser machining apparatus 10. The laser beam 19 generated by the laser radiation source 18 emerges from the optical fiber 20 in the machining head 14 and is collimated by a first collimator lens 28. The collimated laser beam 19 is then deflected through 90° by a dichroic mirror 30 and impinges on a focusing optics 32, the focal length of which may be changed by axially displacing one or more lenses by means of an actuator 34. In this way, the axial position of the focal spot 22 may be changed by adjusting the focusing optics 32. The last optical element in the beam path of the laser beam 19 is a protective screen 38, which is exchangeably fixed to the machining head 14 and protects the remaining optical elements from splashes and other contaminants, which arise at the machining point indicated at 36.

The laser machining apparatus 10 also includes an optical coherence tomograph 40 (so-called SD OCT, Spectral Domain Coherence Tomograph) operating in the spectral range. The coherence tomograph 40 has a light source 42, an optical circulator 44 and a fiber coupler 46, which divides the measurement light 48 generated by the light source 42 into a reference arm 50 and an object arm 52. In the reference arm 50, after passing through an optical path which corresponds approximately to the optical path of the measurement light in the object arm 52, the measurement light is reflected by a mirror 53 and returns to the optical circulator 44, which forwards the measurement light to a spectrograph 54.

In the object arm 52, the measuring light emerges at the end of another optical fiber 56 and is collimated by a second collimator lens 58. The collimated measuring light 48 first passes through a first Faraday rotator 86, which rotates the polarisation direction through 45°. A similar second Faraday rotator 84 is arranged in the section of the free beam propagation in the reference arm 50. The two Faraday rotators 84, 86 have the task of avoiding interference that may arise when the optical fibers used in the coherence tomograph 40 do not receive the polarisation state.

Subsequently, the collimated measuring light 48 impinges on a wedge plate 60, which may be rotated by a motor 62 about an axis of rotation 64. As may be seen in the enlarged view of FIG. 3a, the wedge plate 60 has a first flat surface 66 that is aligned perpendicularly to the axis of rotation 64 and provided with a coating 68 which reflects about 50% of the incident measuring light 48. Since the flat surface 66 does not change its orientation upon rotation of the wedge plate 60, it produces a first measuring beam 70a whose direction is also invariable.

Figures 3A, 3B:
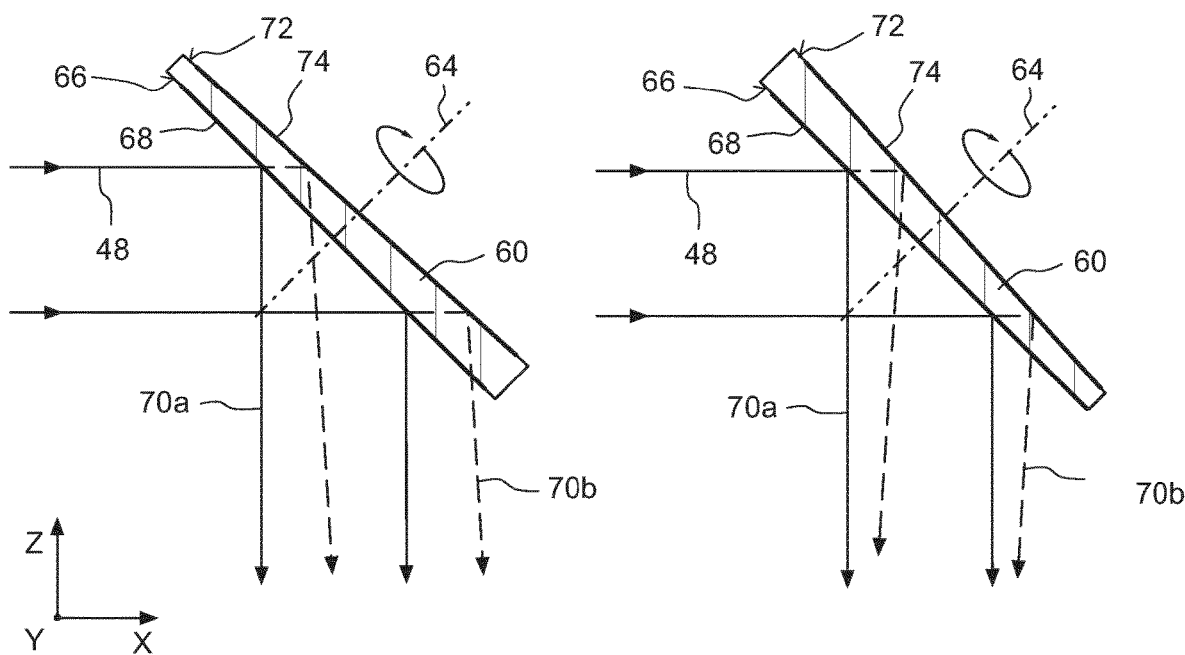
FIGS. 3a and 3b show a sectional view through a wedge plate, with the aid of which two measuring beams are generated in two different rotational positions.

The portion of the measuring light 48, which passes through the partially reflecting coating 68, strikes a second flat surface 72 of the wedge plate 60, which is at an angle different from 90° to the axis of rotation 64. The orientation of the second flat surface 72 thus depends on the angle of rotation of the wedge plate 60. The second flat surface 72 is provided with a completely reflective coating 74. Since the two planar surfaces 66, 72 are not parallel to one another, the second flat surface 72 generates a second measuring beam 70b, which has a different propagation direction to that the first measuring beam 70a. The direction of propagation depends on the angle of rotation of the wedge plate 60 with respect to the axis of rotation 64 as illustrated in FIG. 3b. In this case, the wedge plate 60 has been rotated about the axis of rotation 64 through an angle of 180° compared to the arrangement shown in FIG. 3a. When the wedge plate 60 rotates about the axis of rotation 64, the second measuring beam 70b therefore continuously rotates about the stationary first measuring beam 70a.

A similar effect may also be achieved with a rotating transmission prism having an inner circular-shaped region whose parallel flat surfaces are oriented perpendicularly to the axis of rotation. This region is surrounded by a ring cut out of a wedge. During the rotation of the prism by means of a hollow shaft, at least one wedge surface of the ring changes its orientation. Measuring light 48 falling on the inner circular disk-shaped region is not interrupted and forms the first measuring beam 70a. The light incident on the ring is deflected at the inclined wedge surface to form the second measuring beam 70b, which rotates about the fixed first measuring beam 70a. Reference is again made below to FIG. 2 in order to explain the beam path of the two measuring beams 70a, 70b in more detail. The measuring beams 70a, 70b, which are indicated by solid or double-dashed lines, are first expanded by means of a diverging lens 76 and then collimated by a third collimator lens 78. After passing through the dichroic mirror 30, which is transparent to the wavelengths of the measuring light, the measuring beams 70a, 70b are focused exactly as the laser beam 19 of the focusing optics 32 and directed to the workpieces 24, 26 after passing through the protective screen 38. Since the first measuring beam 70a propagates coaxially with the laser beam 19, the focal spot 80 of the first measuring beam 70a coincides with the focal spot 22 of the laser beam 19. The focal plane of the second measuring beam 70b is coplanar with the focal plane of the laser beam 19 and the first measuring beam 70a.

Figure 4:
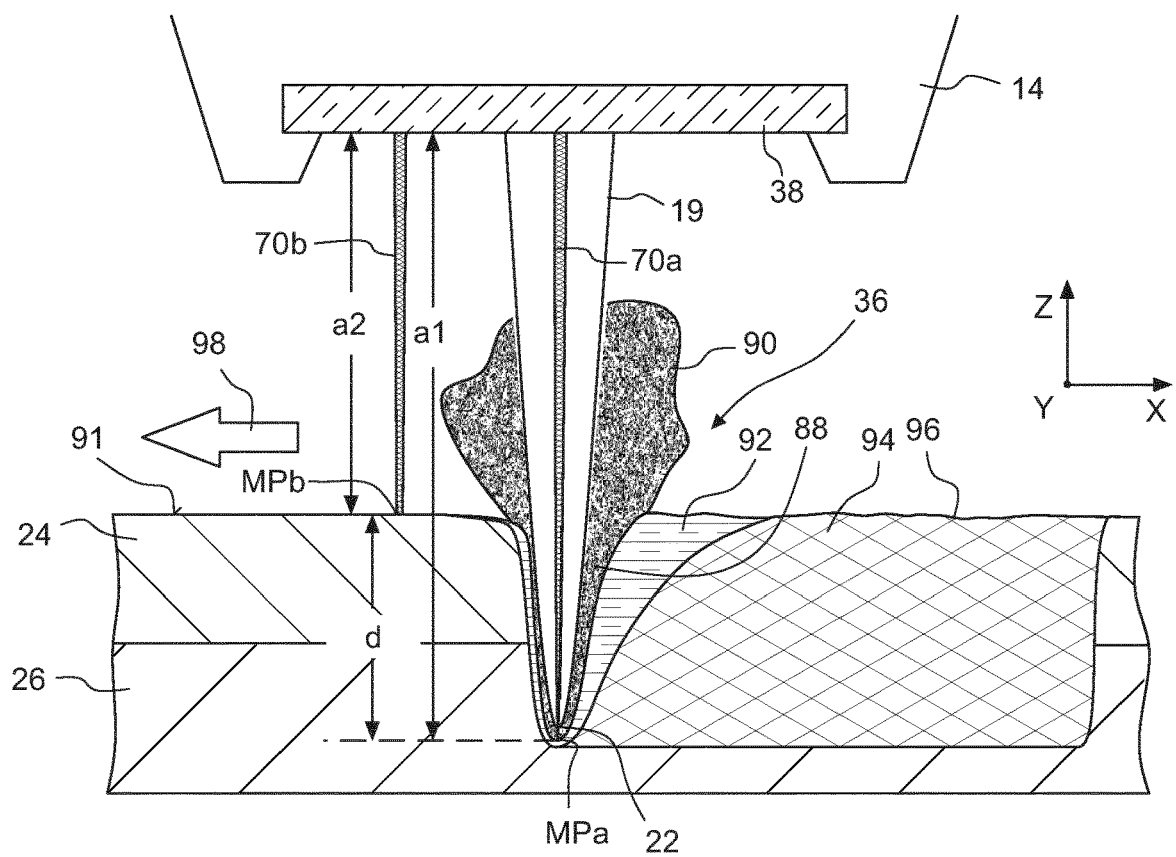
FIG. 4 shows an enlarged section of two workpieces, in which the vapor capillary is visible.

The conditions at the machining point 36 will be described in more detail below with reference to FIG. 4. FIG. 4 shows an enlarged detail of the workpieces 24, 26 which are to be welded together. The direction of travel of the machining head 14 relative to the workpieces 24, 26 is designated by 98.

The focused laser beam 19 emerging from the protective screen 38 reaches such a high energy density in the vicinity of the focal spot 22 that the surrounding metal evaporates to form a vapor capillary 88, which extends into the two workpieces 24, 26. Although a portion of the vaporised metal forms a cloud 90 over the surface 91 of the first workpiece 24, the vapor capillary 88 only refers to the cavity forming beneath the surface 91 during machining.

The vapor capillary 88 is surrounded by a melt 92, which solidifies with increasing distance from the focal spot 22 of the laser beam 19. In the region of the melt 92, the materials of the two workpieces 24, 26 join together. When the melt 92 solidifies, this results in a weld 94, whose upwardly-facing side is irregularly wavy and is referred to as a weld bead 96.

In the enlarged view of FIG. 4, it may be seen that the focal spot, which is generated by the first measuring beam 70a, approximately coincides with the focal spot 22 of the laser beam 19. In the vicinity of the focal spot 22, the first measuring beam 70a strikes the metallic melt 92 at the bottom of the vapor capillary 88 and is reflected back therefrom into the object arm 52 of the coherence tomograph 40. The point at which the first measuring beam 70a meets the bottom of the vapor capillary represents a first measuring point MPa assigned to the first measuring beam 70a.

The point at which the second measuring beam 70b is reflected by the surface 91 of the first workpiece 24 surrounding the vapor capillary 88 represents a second measuring point MPb assigned to the second measuring beam 70b.

Figure 5:
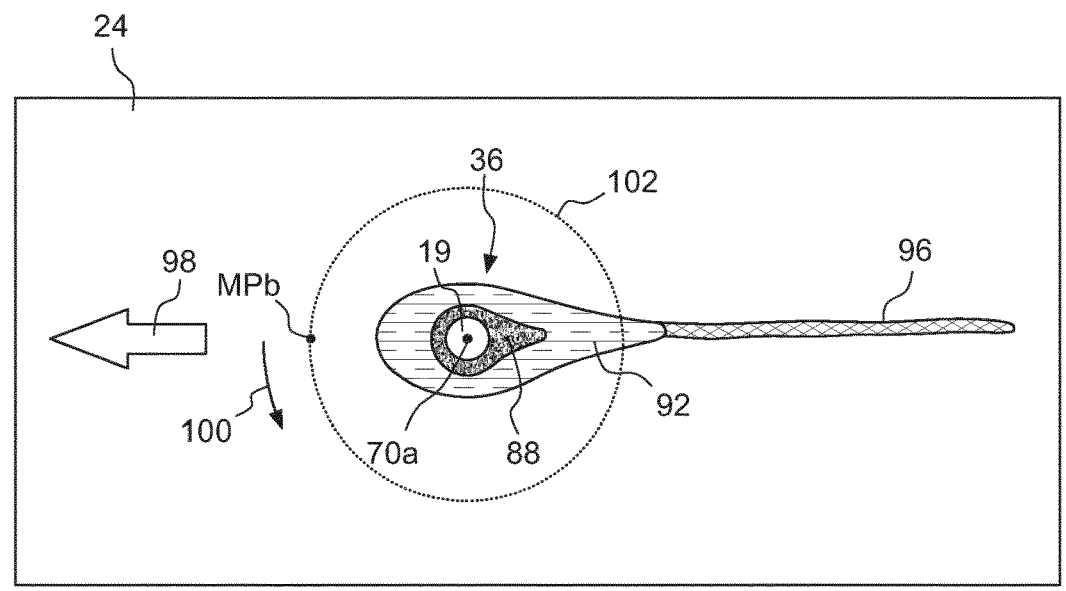
FIG. 5 shows a plan view of the detail shown in FIG. 4.

FIG. 5 shows a plan view of the first workpiece 24 for the section shown in FIG. 4. If the machining head 14 is moved in the travel direction 98 to produce a weld 94, then the previously mentioned weld bead 96 is formed in the travel direction 98 behind the vapor capillary 88. An arrow 100 indicates how the second measuring point MPb rotates upon rotation of the wedge plate 60 on a circular path 102 around the processing point 36. The second measuring point MPb also passes over part of the melt 92. If the wedge angle of the wedge plate 60 is selected to be larger, the radius of the circle 102 increases. In this case, the second measuring point MPb may also sweep the welding bead 96. At a measuring frequency of the coherence tomograph 40 in the order of a few kHz, a rotation frequency of the wedge plate 60 in the order of 100 Hz and a speed along the direction of travel 98 in the order of 1 to 10 m/min, the relief of the surface 91 in the vicinity of the processing station 36 may be scanned with high resolution in this way.

2. Determination of the Penetration Depth

The penetration depth is designated d in FIG. 4 and is defined as the depth of the vapor capillary 88 below the surrounding (still solid) surface 91 of the first workpiece 94. If the penetration depth is not deep enough, the two workpieces 24, 26 are not, or only partially, welded together. On the other hand, if the penetration depth d is too deep, through welding occurs.

For flat workpieces of constant thickness, the penetration depth d is often constant. In general, however, the penetration depth d depends on the coordinates x, y on the workpieces. Changes in the penetration depth d may be required, for example, if the thickness of the first workpiece 24 is location-dependent.

For measuring the penetration depth d, the first measuring beam 70a measures at the first measuring point MPa, the distance of the bottom of the vapor capillary 88 relative to a reference point at which this is possible, for example a point on the surface of the protective glass 38 that is traversed by the optical axis OA. In FIG. 4, this distance is designated a1.

At the second measuring point MPb, the second measuring beam 70b measures the distance between the reference point and the surface 91 of the first workpiece 24 surrounding the vapor capillary 88. The penetration depth d then results simply as the difference between the distances a2 and a1.

The measuring light that was guided in the object arm 52 and, after reflection at the measuring points MPa, MPb, that entered the object arm 52 again, is evaluated in order to determine the distances a2 and a1. This portion of the measuring light passes through the further optical fiber 56 back to the fiber coupler 46 and the optical circulator 44 and interferes in the spectrograph 54 with the measuring light which has been reflected in the reference arm 50. The interference signal is fed to a control and evaluation device 114 (see FIG. 2), which then calculates the optical path length difference of the measurement light reflected in the reference arm 50 and in the object arm 52. From this, the distances a1, a2 of the measuring points MPa, MPb may be derived from the common reference point.

In that regard, the construction and the function of the laser machining device 10 are already known from the aforementioned WO 2015/039741 A1. What is new and inventive is the procedure described below, wherein the measurement data of the coherence tomograph are computationally evaluated by the control and evaluation device 114.

3. Computational Evaluation of the Measurement Data

As mentioned above, the coherence tomograph 40 is an SD OCT using a comparatively broad band light source 42. All the reflected spectral components of the measuring light are detected simultaneously in the spectrograph 54. Such coherence tomographs make it possible to determine a complete depth profile of partially reflecting or scattering structures in a single measurement. However, the coherence tomograph 40 may also be embodied as SS OCT (Swept Source OCT), in which the wavelength of a narrow band light source is quickly tuned in. In this case, a single light-sensitive element which sequentially determines the spectral components is sufficient. However, in this case, significantly fewer distance values are received, so that the rapidly-changing distance a1 to the bottom of the vapor capillary 88 may not be measured frequently enough.

In the following, therefore, an SD OCT is assumed; the following remarks apply accordingly to SS OCT mutatis mutandis.

In an SD OCT, at any time $t_i$, i=1, 2, 3, . . . , during the laser machining process, a set of raw measurement data in the form of an interference spectrum is obtained. The spectral intensity $P_{int}(k)$ of the measuring light detected by the spectrograph 54 is described by the equation (1):

$$P_{int}(k) = P_{ein}(k)\left\{R_R + \sum_j R_{S,j} + 2\sum_j \sqrt{R_R R_{S,j}} \cos(2k(z_R - z_{s,j})) + 2\sum_{j,m} \sqrt{R_{S,j} R_{S,m}} \cos(2k(z_{s,j} - z_{s,m}))\right\}. \quad \text{Eq. (1)}$$

Where $P_{int}(k)$ is the power spectrum of the light source 42, $R_R$ is the reflectance in the reference arm, $R_{Sj}$ is the reflectance of the $j^{th}$ interface or structure in the measurement object, $z_R$ is the optical path length in the reference arm 50, and $z_{Sj}$ is the optical path length in the object arm 52 to the $j^{th}$ interface or structure.

The first summand $P_{int}(k)\Sigma_j R_{s,j}$ describes a DC component that depends on the power spectrum of the light source 42 and the reflectance $R_R$ in the reference arm 50. This proportion may be determined by implementing a measurement without a measurement object. It then holds for all reflectivities $R_{Sj}=0$, where $P_{int}(k)=P_{ein}(k) R_R$. Therefore, this proportion is hereinafter referred to as "dark spectrum".

The second summand $P_{ein}(k)\Sigma_j R_{s,j}$ describes another DC component, which depends on the power spectrum of the light source 42 and the reflectance RSj of the structures in the object arm 52. If an ideal mirror with the highest possible spectrally independent reflectance is used as the measurement object, then $\Sigma_j R_{s,j} \approx 1$. From a measurement of $P_{int}(k)$, the power spectrum $P_{ein}(k)$ of the light source 42 may then be determined with knowledge of the dark spectrum, which is referred to here as the "white spectrum".

The term in the second line contains cross-correlations that are of interest for the measurement. Every reflection in the measurement object leads to a modulation of the interference spectrum in k-space. In other words, each frequency component in the measured interference spectrum corresponds to a specific distance from a partially reflecting or scattering structure of the measurement object. Since the length of the reference arm 50 is usually chosen so that it is either significantly shorter or significantly longer than all typically occurring optical path lengths in the object arm 52, each modulation frequency may be assigned a unique distance ZSj in the measurement object.

The term in the third line of equation (1) describes the autocorrelation of the measurement object, which is not due to the interference between the reflections on the measurement object and the reference arm, but rather to the interference with one another of the reflections on the measurement object. Since the reflectivity in the reference arm $R_R$ is usually much larger than the reflectivities $R_{Sj}$ in the measurement object, the third term is negligible compared to the second term in most cases.

Figure 6:
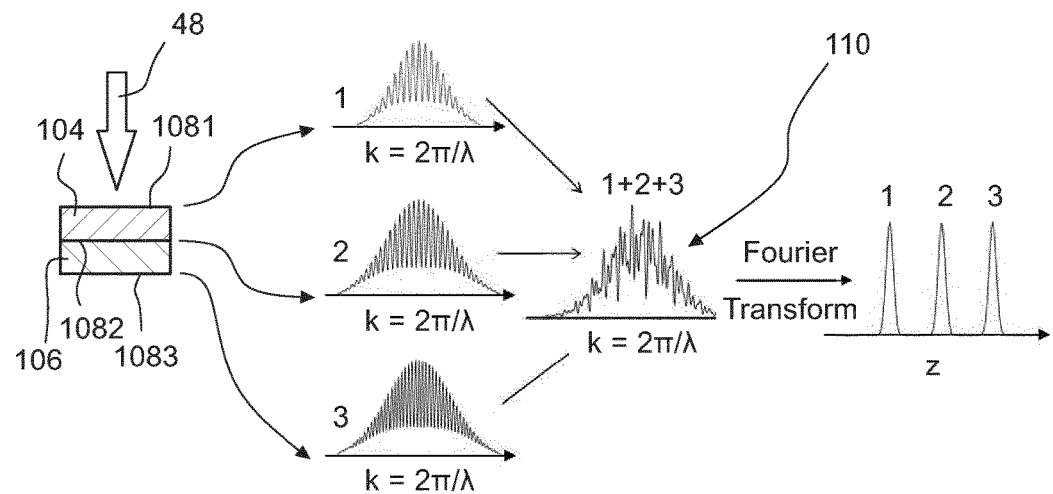
FIG. 6 shows a graph schematically illustrating the generation of spectra at optical interfaces in an FD coherence tomograph.

FIG. 6 illustrates these relationships in a schematic representation. On the left is shown an arrangement of two glass plates 104, 106. At each of the three optical interfaces 1081, 1082 and 1083, there is a jump in refractive index and thus a partial reflection of the incident measurement light 48.

Three interference spectra 1, 2, 3 are shown to the right of the arrangement of the glass plates 104, 106. The interference spectrum 1 is detected by the spectrometer 54 when only the first interface 1081 is in the beam path of the measuring light 48. The reflection of the measuring light 48 at the first interface 1081 leads, according to the term in the second line of equation (1), to a modulation of the spectrum in k-space, which is proportional to the difference of the optical path lengths of the measuring light 48 in the reference arm 50, on the one hand, and in the object arm 52, on the other hand. The sought distance information is thus encoded in the frequency with which the intensity oscillates in k-space.

Corresponding references apply to the interference spectra 2 and 3 and the optical interfaces 1082 and 1083 assigned to these interference spectra. The optical path length in the reference arm 50 is determined here so that the modulation of the intensity in the k-space is all the higher, the more remote is the optical interface from the coherence tomograph 40.

However, since the measuring light 48 strikes not only one of the interfaces 1081, 1082, 1083 but all interfaces, the interference spectra 1, 2 and 3 are superimposed. The spectrometer 54 thus determines only the complete spectrum 110 shown on the right, which represents an additive superimposition of the interference spectra 1, 2 and 3.

The spectral components, i.e. the modulation frequencies of spectra 1, 2 and 3, are obtained by an inverse Fourier transform. This is shown on the right in FIG. 6. In the example shown, a distance z is obtained which is assigned to the interference spectra 1, 2 and 3 for each optical interface 1081, 1082 and 1083.

However, the representation of the inverse Fourier transforms is greatly simplified in FIG. 6. As already mentioned, the overall spectrum 110 measured by the spectrometer 154 is not only supported by the individual spectra of interest 1, 2 and 3, but also by the constant DC contribution from the first line of equation (1) and the cross-correlation between the portions of the measuring light 48 according to the third line of the equation (1). The inverse Fourier transform therefore contains further contributions, which are not shown on the right in FIG. 6 for the sake of simplicity. In the equation (2) in which the inverse Fourier transform of the spectral intensity $P_{int}(k)$ is given, these other contributions are listed in the first and third lines.

$$\mathcal{F}^{-1}[P_{int}(k)](z) = \mathcal{F}^{-1}[P_{ein}(k)]\left(R_R + \sum_j R_{S,j}\right) + \quad \text{Eq. 2}$$

$$\mathcal{F}^{-1}[P_{ein}(k)] \otimes \sum_j \sqrt{R_R R_{S,j}}\, \delta(z \pm 2(z_R - z_{s,j})) +$$

$$\mathcal{F}^{-1}[P_{ein}(k)] \otimes \sum_{j,m} \sqrt{R_{S,j} R_{S,m}}\, \delta(z \pm 2(z_{s,j} - z_{s,m})).$$

From the above explanation, it is clear that as a rule, not only a single but a multiplicity of distance values z is obtained at any time $t_i$. Any structure that causes a portion of the incident measuring light to go back again into the object arm 52 of the coherence tomograph 40 due to reflection or scattering, thus leads to a distance value z.

Figure 7:
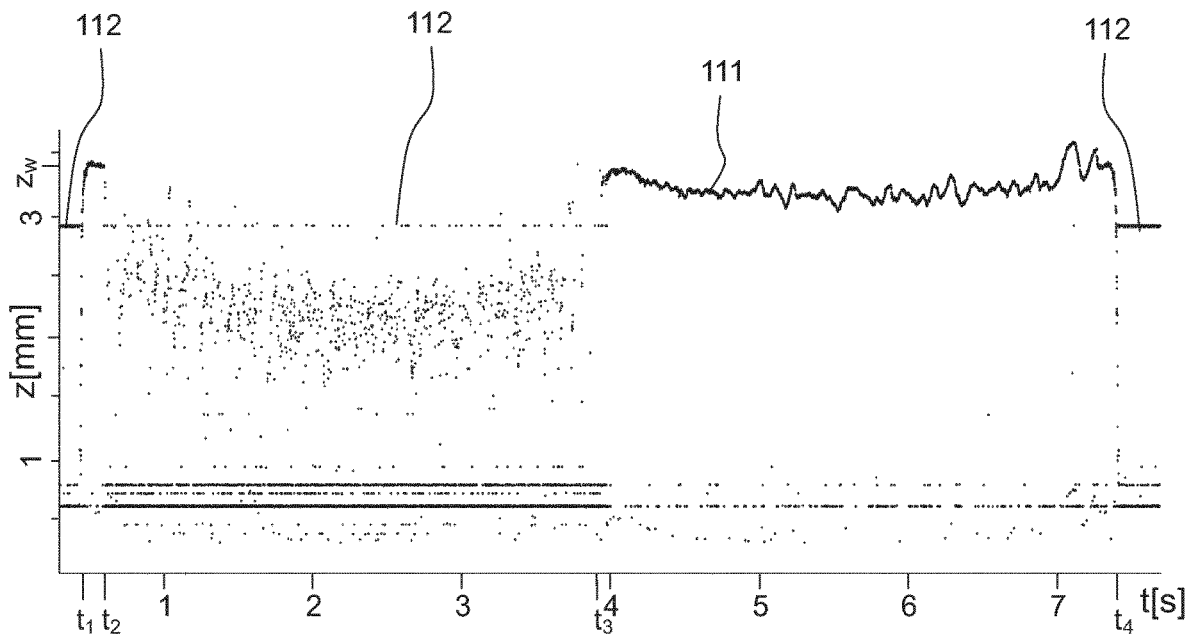
FIG. 7 shows a graph in which measured distance values versus time are shown during a welding run.

In FIG. 7, real measured values are plotted for the distance z obtained by Fourier transform, wherein they were determined during a welding run with the aid of the coherence tomograph 40. In this case, a coherence tomograph was used in which the first measuring beam 70a propagates coaxially with the laser beam 19; wherein the distance to the surface 91 was not determined by a second measuring beam 70b, but by a mechanical tactile sensor. Thus, the graph contains only measurement data for the distance a1 during the laser machining.

At time $t_1$, the first measuring beam 70a, and thus also the laser beam 19, strike the first workpiece 24. The measured value $z=z_w$ initially corresponds to the distance a2 to the surface 91. Shortly thereafter, i.e. at time $t_2$, the temperature in the workpiece 24 is so high that the vapor capillary 88 is formed. It may be seen that the distance values z are now scattered over a large distance range. Experiments have shown that the first measuring beam 70a is often reflected before reaching the bottom of the vapor capillary 88. The exact causes of this are not yet known in detail, since the processes in the vapor capillary 88 are complex and difficult to observe. Possibly, the vapor capillary 88 moves so rapidly in the lateral direction during laser machining that the first measuring beam 70a often only strikes the lateral wall of the vapor capillary, but not its bottom. Metal oxide droplets which form in the vapor capillary 88 by condensation of the metal vapor or by dissolving splashes from the melt 92 are also conceivable as the cause.

Investigations have shown that only the largest of the widely scattered distance values represent the distance a1 to the bottom of the vapor capillary 88. These largest distance values may be determined by using special filters, e.g. like the quantile filter as explained below in more detail.

At time $t_2$, the laser radiation source 18 is turned off and the direction of movement is reversed. The first workpiece 24 is then moved so that the first measuring beam 70a moves off the weld bead 96 that has formed after cooling of the metallic melt 92, and detects its relatively rough surface profile 111. At time $t_4$, the first measuring beam 70a again reaches the end of the first workpiece 24.

In the graph of FIG. 7, additional artifacts, which affect the above-described measurement as interfering signals are recognisable. A first artifact 112 appears to be at a distance of about z=2.9 mm and is represented by a number of measurements approximately on a horizontal line, thereby indicating a stationary scattering or reflecting interface. Even during the formation of the vapor capillary 88, such an interface appears to be located above the vapor capillary, whereas on the return of the first measurement beam 70a via the weld bead 96 ($t>t_3$), this apparent interface is no longer present.

Several other artifacts are located at a distance of less than 1 mm; here, too, most of the measuring points are lined up along horizontal lines and suggest the existence of stationary reflecting or scattering surfaces in the said distance range.

The causes of these artifacts are manifold. Investigations by the Applicant have shown that the measured distance values also contribute to very weak (multiple) reflections which arise in optical fibers and, in particular, at their connectors. As a result of the high measuring sensitivity, the coherence tomograph 40 also detects such extremely weak reflections.

Another cause of artifacts is probably due to comparatively slow changes of optical components in the beam path of the measuring light. These changes may cause the above-mentioned dark spectrum, which is generally subtracted from the measured interference spectrum. However, since the dark spectrum is detected only once before the measurement process and then subtracted unchanged from the measured interference spectra during the entire measurement process, slow drift movements may lead to the artifacts shown.

In the following, different approaches are described of how to effectively suppress the measurement data generated with the aid of the coherence tomograph 40 in order to obtain more accurate measured values for the depth d of the vapor capillary 88.

a) Subtraction of the Predecessor Spectrum

Figure 8:
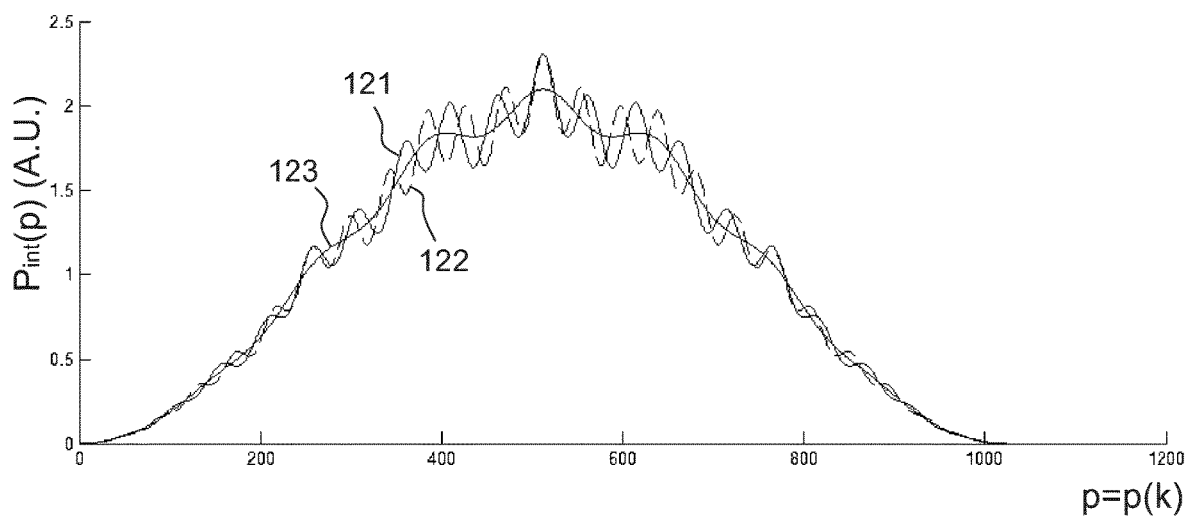
FIG. 8 shows a graph in which two spectra, which were generated by two different boundary surfaces in the beam path of the measuring light, are shown to explain a first exemplary embodiment.

FIG. 8 shows a graph in which, by way of example, two interference spectra, which were generated by two different boundary surfaces in the beam path of the measuring light, are plotted. The abscissa shows the pixel number p as a function of the wave number k. The pixel number p refers to the pixels of the CCD sensor contained in the spectrograph 54 and recording the interference spectra. Each pixel corresponds to a certain wave number k, wherein the relationship is not necessarily linear. Therefore, the pixel number p must generally be converted into the wave number k by using a suitable transformation function.

A solid line in FIG. 8 shows a first interference spectrum 121 while a dashed line shows a second interference spectrum 122. Each of the interference spectra corresponds to a partially reflecting or scattering optical structure and thus a certain distance value z. The two interference spectra 121, 122 are additionally modulated by a slowly varying interference spectrum 123, which represents an interference. In order to better distinguish the two interference spectra 121, 122, they are not in superimposed form as they are actually detected by the spectrograph 54 and applied separately.

Figure 9:
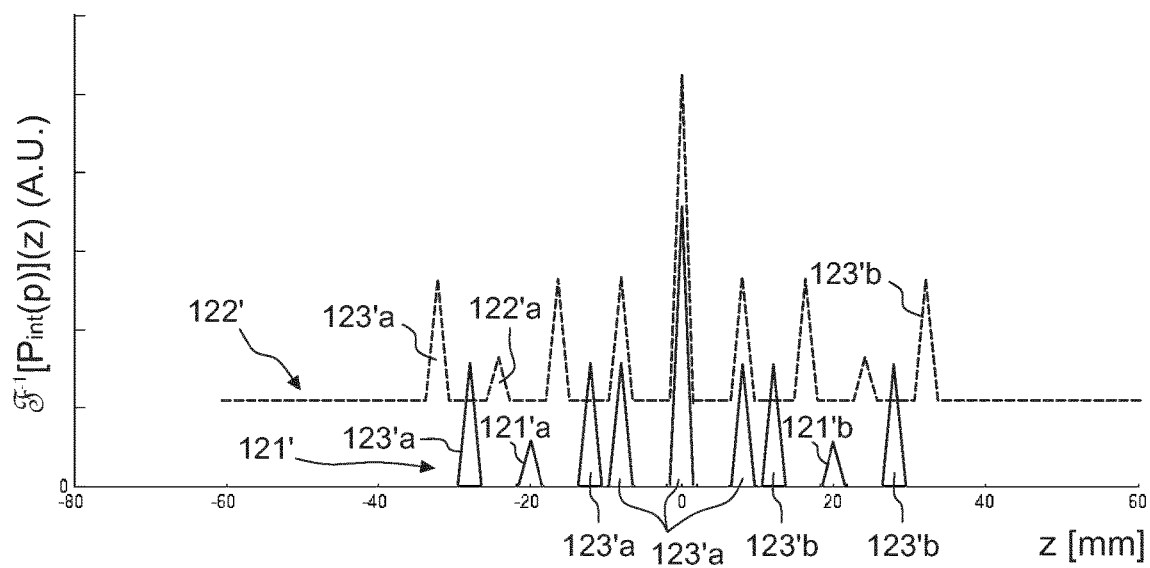
FIG. 9 shows a graph showing the inverse Fourier transforms of the spectra shown in FIG. 8.

FIG. 9 shows a graph in which the Fourier transforms 121', 122' of the interference spectrums 121, 122 modulated by the interference, and are plotted separately so that they may be better distinguished from one another. Since the disturbed interference spectrum 121 may be described as the product of an undisturbed interference spectrum and the interference spectrum 123, the Fourier transform 121' of the disturbed spectrum 121 results in a convolution of the Fourier transform of the undisturbed spectrum with the Fourier transform of the interference spectrum 123.

In the graph of FIG. 9, it may be seen that the solid-lined Fourier transform 121' of the disturbed interference spectrum 121 has two low-intensity distance peaks 121'$a$ and 121'$b$ at z=±20 mm around which are respectively arranged the symmetrical two stronger-intensity interference distance peaks 123'$a$ and 123'$b$, which are a result of the convolution. The distance peaks 121'$a$, 121'$b$ indicate the existence of a partially reflecting or scattering structure at a distance of 20 mm. Further interference distance peaks 123'$a$, 123'$b$ are arranged symmetrically at z=0 mm.

Since the distance peaks 121'$a$, 121'$b$ actually of interest are less powerful than the surrounding interference distance peaks 123'$a$, 123'$b$, no filtering may be carried out in the sense that only the strongest intensity distance peaks in the Fourier transform are considered "genuine" distance values to be taken into account. Conversely, it is also not possible to ignore the strongest intensity distance peaks, since the ratios shown in FIG. 9 may also be precisely exchanged in the case of less powerful interferences or stronger reflections at optical interfaces. i.e. the spacing peaks of interest may be more powerful than the spurious distance peaks.

Corresponding considerations also apply to the Fourier transform of the disturbed second interference spectrum 122'. In this case, also, there are interference distance peaks 123'1, 123'$b$ symmetrical around the distance peaks 122'$a$, 122'$b$ of interest at z=±24 mm and around the central value z=0. Since the Fourier transforms 121', 122' in superimposed form result from the Fourier transform of the entire spectrum, it may be very difficult to filter out the desired distance information from the Fourier transform of the entire spectrum.

To solve this problem, it is proposed according to a first embodiment of the invention, that each interference spectrum $P_{int,tn}(k)$, that was generated at time $t_n$, the spectrum $P_{int,tn-1}(k)$, that was generated at the immediately preceding instant $t_{n-1}$, are subtracted at least partially and preferably completely according to equation (3):

$$\Delta P_{int,tn}(k) = P_{int,tn}(k) - P_{int,tn-1}(k) \qquad \text{Eq.3}$$

The Fourier transform is then supplied only for the thus calculated difference spectrum $\Delta P_{int,tn}(k)$.

Figure 10:
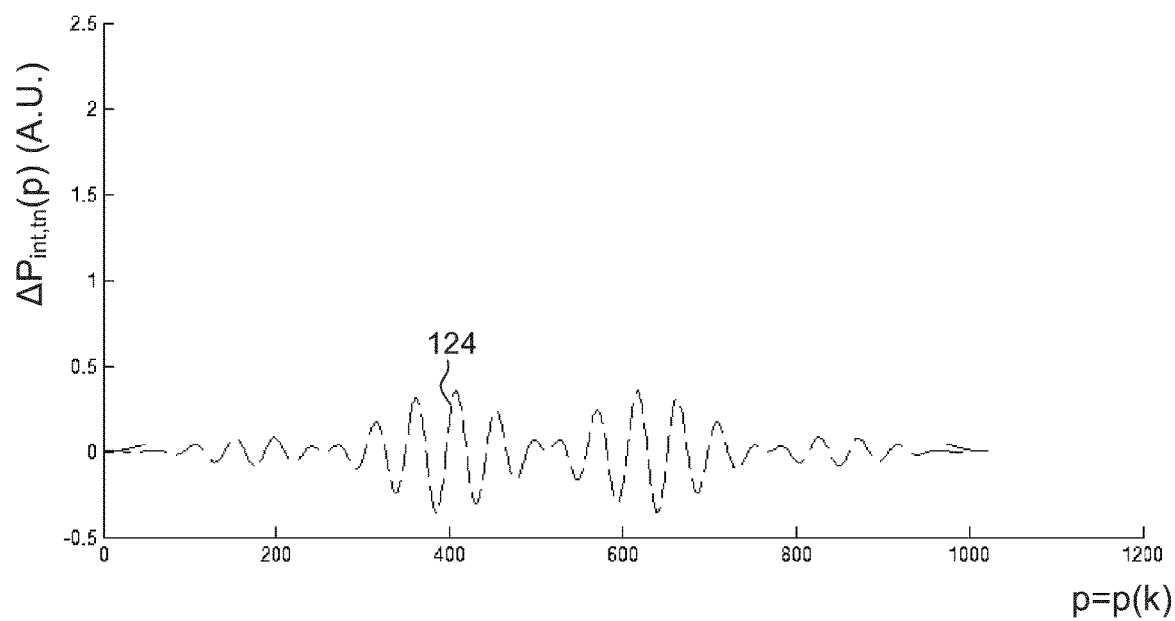
FIG. 10 shows a graph in which a difference spectrum between two interfered spectra is shown.
Figure 11:
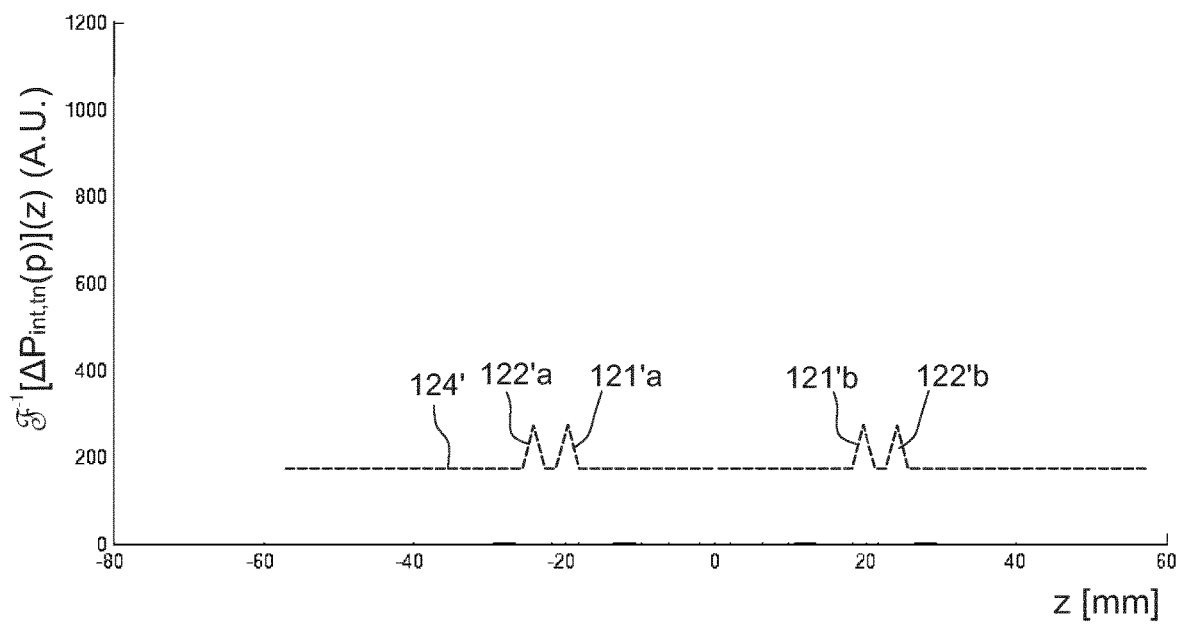
FIG. 11 shows a graph showing the inverse Fourier transform of the difference spectrum shown in FIG. 10.

FIG. 10 illustrates this with reference to a graph in which a difference spectrum $\Delta P_{int,tn}(k)$ is shown by way of example. It was assumed here that at the time $t_{n-1}$, a disturbed interference spectrum was obtained, which represents a distance value of z=24 mm, and at time $t_n$, a disturbed interference spectrum was obtained which represents a distance value z=20 mm. Since the interference spectrum 123 does not change, or changes only insignificantly, between two immediately successive times $t_n$, $t_{n-1}$, the influence of the interference spectrum in the subtraction of the disturbed interference spectra is largely eliminated. The difference spectrum $\Delta P_{int,tn}(k)$ obtained by the subtraction is denoted by 124 in FIG. 10 and represents a beat which oscillates with the average of the individual frequencies and is modulated with the beat frequency, which is given by the amount of the difference of the individual frequencies, FIG. 11 shows the Fourier transform 124' of the difference spectrum 124 in a representation similar to that of FIG. 9. This contains only the desired distance peaks at z=±24 mm and z=±20 mm. The influence of the interference was thus completely eliminated by the difference formation. For each measurement, not only one, but two distance peaks are obtained. In principle, it could be determined which distance peaks were added at the time tn at the last measurement by comparison with the previous measurement results. Since a large number of distance peaks occur anyway during the measurement, the multiple values obtained multiple times may simply be additionally taken into account in the subsequent evaluation without this impairing the measurement accuracy.

This procedure works all the better, the slower are the interference changes during the welding run. As already explained above, some interferences are largely constant. Other interferences change due to various drift events, but are very slow compared to the rapid fluctuations in the vapor capillary 88. As a result, the difference formation described above may very well reduce the influence of the interferences in the measurement within a rapidly changing vapor capillary.

If it is known that the intensity of the interference spectrum 123 changes, and may be taken into account by the fact that the interference spectrum measured at the immediately preceding instant $t_{n-1}$ is not completely, but only partially, for example 99.9%, subtracted. In this way, a weakening interference may be taken into account in the course of the measurement. Of course, more complicated dependencies are possible. In this case, from equation (4)

$$\Delta P_{int,tn}(k) = P_{int,tn}(k) - P_{int,tn-1}(k) \cdot g(k) \qquad \text{Eq. 4}$$

where the function g(k) f expresses the change in the interference. If the interference increases, it goes without saying that g(k)>1.

In principle, it is also possible not to subtract the interference spectrum generated at the immediately preceding time $t_{n-1}$ but at a later time, e.g. $t_{n-2}$ or $t_{n-3}$. However, this will usually only be practicable if the interference remains essentially constant during the measuring process.

In order to be able to eliminate the influence of more rapidly changing interferences, a moving average calculated from the perturbing interference spectrum measured at time $t_n$ may be at least partially calculated from several perturbing interference spectra at several earlier times $t_j$, where j<n, were generated. By forming such a moving average, short-term changes in the interference spectrum may be effectively eliminated because the moving average identifies a trend in the course of the interference spectrum. The simple moving average is calculated according to equation (5):

$$\overline{P_{int,tn}(k)} = \frac{1}{m}\sum_{n=0}^{m-1} P_{int,tn}(k) \qquad \text{Eq. 5}$$

In many cases, averaging with the order m=2 is sufficient.

It is particularly favorable if an exponentially smoothed average value $\overline{P_{int,tn}(k)}'$ according to equation (6)

$$\overline{P_{int,tn}(k)}' = \alpha P_{int,tn}(k) - (1-\alpha)\overline{P_{int,tn-1}'(k)} \qquad \text{Eq. 6}$$

is used. In this way, earlier spectra are weighted more heavily than more recent spectra, wherein the average value reacts very quickly to changes in the same smoothing.

The concept of completely or partially subtracting a predecessor spectrum or an average of several predecessor spectra from the measured interference spectra, also has the advantage that the dark spectrum no longer has to be recorded before each welding run and subtracted from the measured interference spectra. These temporally largely immutable influences are automatically eliminated by the difference formation described above.

It is clear from FIG. 9 that a difference formation after carrying out the Fourier transform no longer makes sense. If the Fourier transform of a predecessor spectrum were to be subtracted from the Fourier transform of a disturbed interference spectrum, this would result in the example shown in FIG. 9 with a difference of the two Fourier transforms of the perturbed spectra designated 121' and 122'. However, this difference differs significantly from that shown in FIG. 11. Ultimately, this is due to the fact that the Fourier transform causes the disturbing effects due to the folding multiplied in the Fourier space in such a way that they can no longer be eliminated by means of a simple mathematical operation.

b) Division by Predecessor Spectrum

In a second embodiment, another approach is taken to reduce the impact of interferences on the measurement. For this purpose, each interference spectrum $P_{int,tn}(k)$, which was generated at time $t_n$, divided by an average interference spectrum $\overline{P}(k)$, which is an average of a plurality of interference spectra, which were generated at earlier times $t_j$, where j<m.

Figure 12:
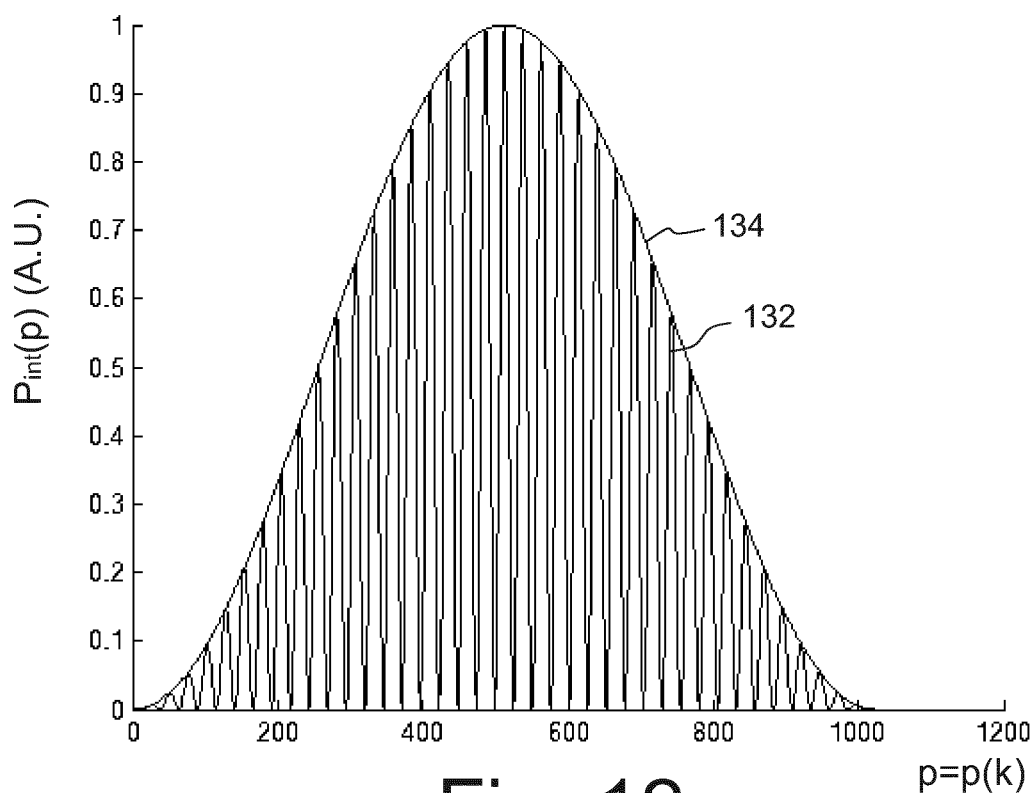
FIG. 12 shows a graph showing an uninterfered spectrum.

To explain this second approach, reference is first made to FIG. 12, which shows an undisturbed interference spectrum 132 generated by the coherence tomograph 40 after being divided by the above-mentioned white spectrum. This eliminates the equation $P_{ein}(k)$ in equation (1), which otherwise leads to undesired widening of the distance peaks in the Fourier transform of the measured interference spectrum. In addition, the signal was windowed in a manner known per se with a $\cos^2$ function 134 in order to reduce the smearing in Fourier space. Here, for the sake of simplicity, only the reflection at a single interface is considered.

Figure 13:
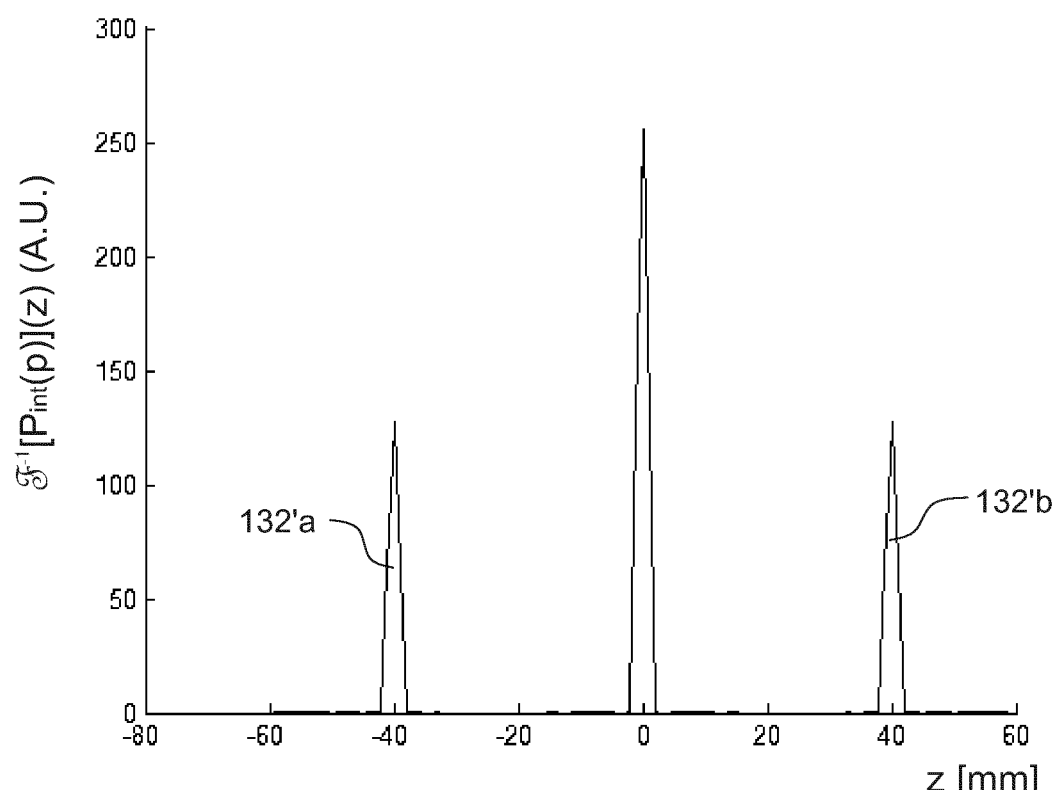
FIG. 13 shows a graph showing the inverse Fourier transform of the uninterfered spectrum shown in FIG. 12.

Accordingly, the Fourier transform 130' shown in FIG. 13 is characterised by two narrow and distinct distance peaks 132'a, 132'b arranged symmetrically about z=0, and indicating the distance of the interface z=40 mm.

Figure 14:
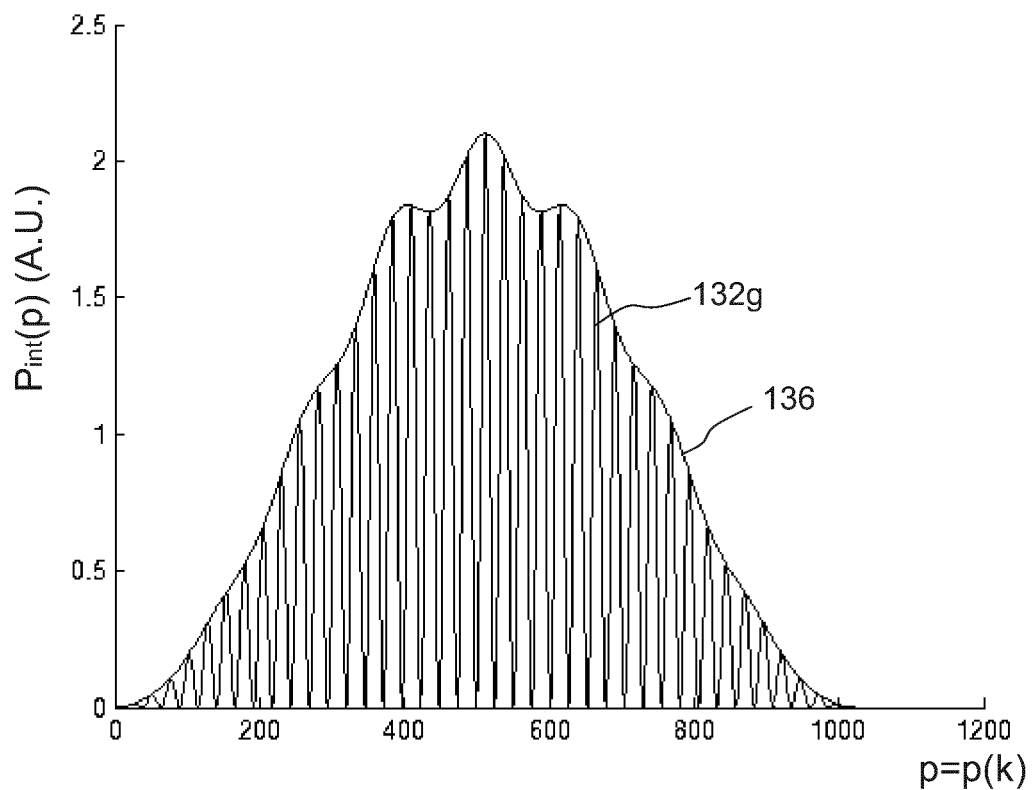
FIG. 14 shows a graph showing an interfered spectrum.

FIG. 14 shows a graph corresponding to FIG. 12, which shows a disturbed interference spectrum 132g (also after division by the abovementioned white spectrum and windowing). The interference is represented by multiplication with a interference function 136 which modulates a ripple on the undisturbed interference spectrum. This disturbance may be caused for example by fluctuations in the power spectrum $P_{ein}(k)$ of the light source 42 or by unwanted (multiple) reflections within the coherence tomograph 40.

Figure 15:
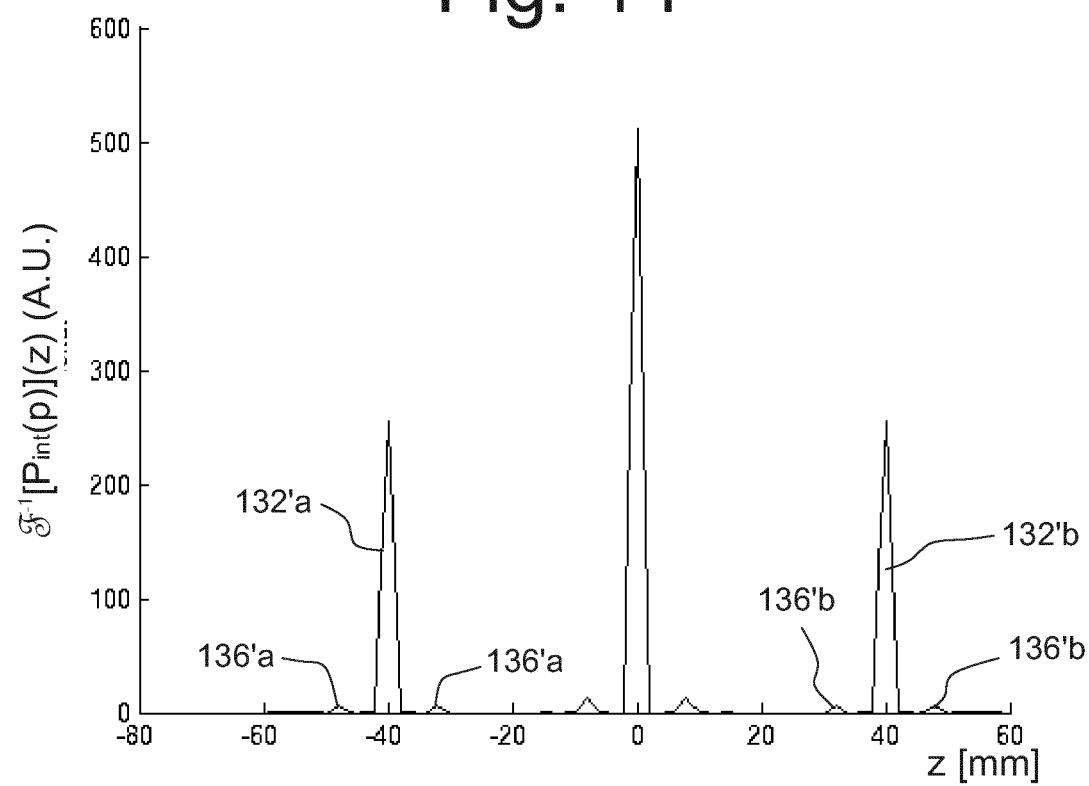
FIG. 15 shows a graph showing the inverse Fourier transform of the interfered spectrum shown in FIG. 14.

As a result of this interference, the Fourier transform 132g' of the disturbed interference spectrum has a plurality of interference distance peaks 138'a, 138'b resulting from the convolution of the Fourier transform 132' shown in FIG. 13 with the Fourier transform of the interference function. In FIG. 15, the intensities of the disturbing distance peaks 136'a, 136'b are small; However, in the case of stronger interferences, these intensities may also be higher than the intensities of the distance peaks 132'a, 132'b, so that under certain circumstances no simple differentiation from the distance peaks of interest is possible.

Figure 16:
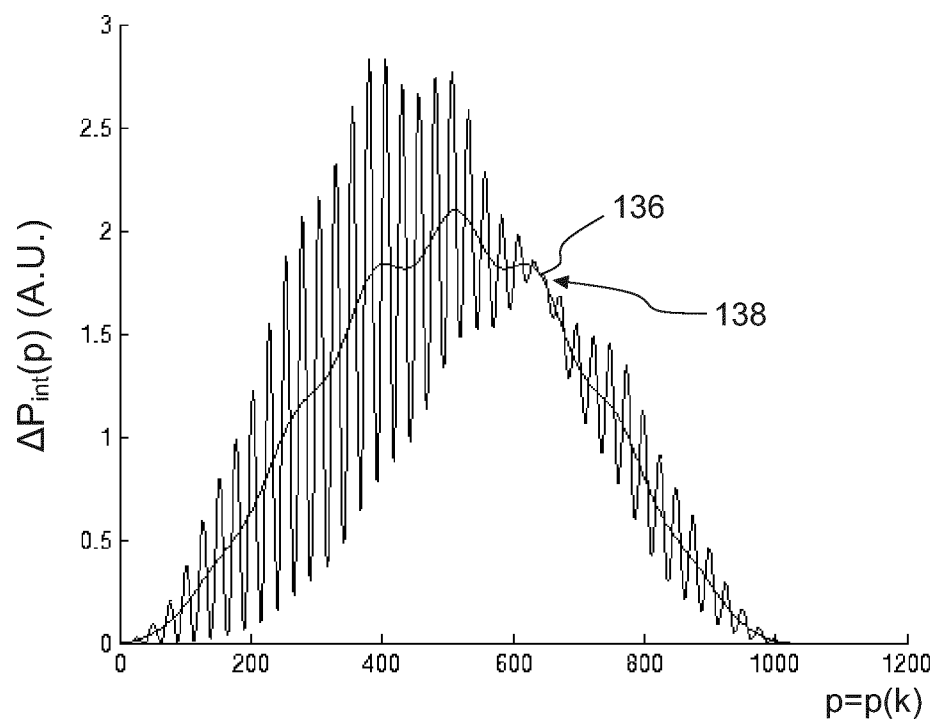
FIG. 16 shows a graph showing a spectrum resulting from the additive superposition of two spectra interfered by a ripple.

To explain how the disturbing distance peaks may be suppressed according to the second approach, reference is made to FIG. 16, which shows an interference spectrum resulting from the additive superimposition of two interference spectra disturbed by a ripple, which were determined by the coherence tomograph 40 at successive times $t_n$ and $t_{n-1}$. The two interference spectra correspond to very closely spaced distance values z=40 and z=40.8. It may be seen that these two spectra compensate each other in part, and even almost completely, at the beat node 138, so that essentially only the ripple modulated as an interference remains.

As simulations have shown, this effect occurs all the more completely, the more that similar interference spectra are additively superimposed. With 50 superimposed interference spectra, the interference function 136 already appears very clearly. With a superimposition of 100 interference spectra, only the interference function remains, while virtually no high-frequency spectral components are any longer recognisable. The fast measurement signal fluctuations are averaged out by the addition of the interference spectra, while the slower fluctuations remain by, for example, going back to drifting.

If one divides the interference spectrum Pint, tn (k) measured at a time tn by an average formed according to equation (5) from a large number of previously acquired interference spectra, the order m should be very large (preferably 50≥m≥100 and in particular 100≥m≥500), and so the interference component will be very largely reduced. The result is almost ideal interference spectra, as shown in FIG. 12. Accordingly, the distances may be reliably derived from the Fourier transform, as shown in FIG. 13. The weak distance peaks associated with the vapor capillary 88 will then no longer be masked by more intense interference distance peaks.

In order that the sum signal is sufficiently "smeared" during the addition of the spectra, the phase position of the high-frequency spectral components should vary statistically. This requirement is usually present, since the surfaces of workpieces usually have a roughness of a few micrometers, resulting in greater variations of the phase position. Conversely, the interference function should change as little as possible during the period considered by the averaging, since otherwise it would also be averaged out.

Alternatively, this approach may also be described in such a way that the measured spectra are normalised by a specially defined and continuously updated white spectrum. In the conventional procedure, it may be the case that the white spectrum measured once in the course of the measurements deviates more and more from the actual power spectrum $P_{ein}(k)$ of the light source 42 and thus leads to measurement errors. The "entrainment" of the white spectrum by means of continuous averaging ensures that such changes in the power spectrum $P_{ein}(k)$ are automatically taken into account.

c) Filtering

By means of the approaches described above, it is possible to remove the artifacts shown in FIG. 7. However, there remains the problem of determining meaningful values for the distances a1 and a2 from the widely scattering distance values measured by the first measuring beam 70a in the region of the vapor capillary 88 and by the second measuring beam 70b on the surface 91 of the workpiece 24.

Figure 17:
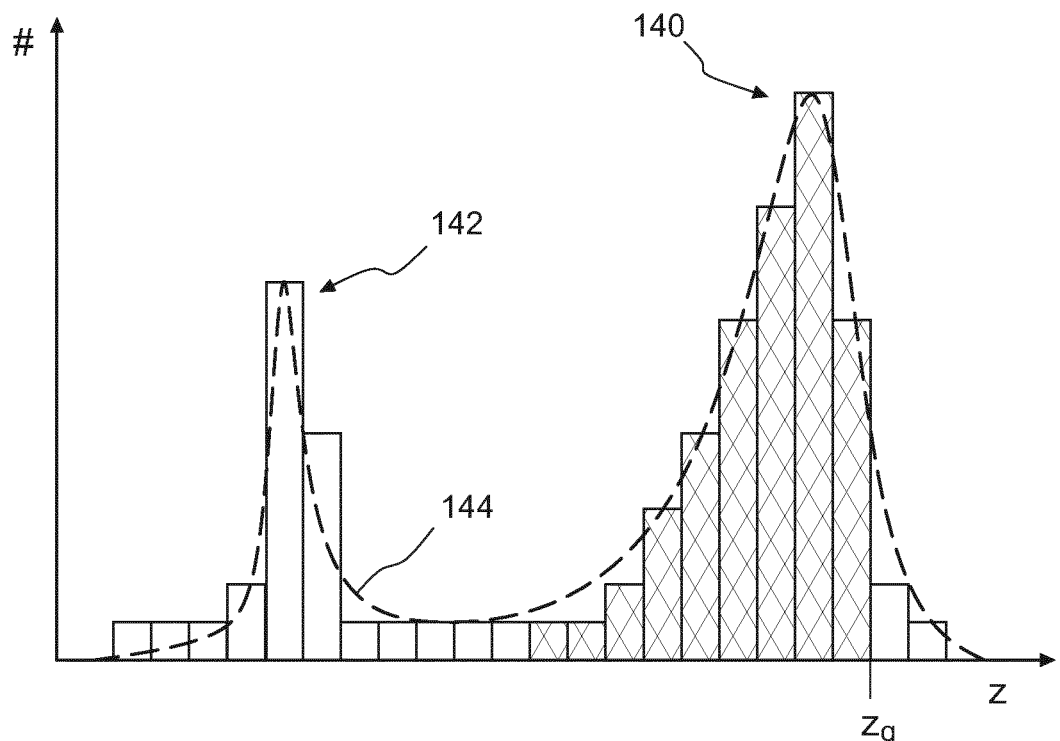
FIG. 17 shows a histogram of a typical frequency distribution of distance values obtained over a given period of time.

FIG. 17 shows a histogram of a typical frequency distribution of distance values z obtained over a time period T in which a plurality of successive measurement times $t_n$ are present. The maximum 140 at relatively large distance values z is comparatively wide and is based on measured values which originate from the first measurement beam 70a directed into the vapor capillary 88. The narrower maximum 142 at smaller distance values z is due to measured values originating from the second measuring beam 70b, which is directed onto the surface 92 of the workpiece 24. In order to obtain the desired distances a1, a2 from such a distribution, the measured distance values must be subjected to additional filtering. Possible approaches to this will be described in more detail below.

i) Quantile Filter

Investigations have shown that only the largest distance values correctly reproduce the distance a1 to the bottom of the vapor capillary 88. To determine these largest distance values, quantile filtering may be implemented. A quantile is a threshold that has the property wherein a certain proportion of the values is less than this threshold, while the remaining portion of the values is greater than this threshold.

For the measurement of the distance a1 to the bottom of the vapor capillary 88, a quantile of about 95% has been found suitable. This means that the "correct" distance value has the property wherein 95% of all measured distance values are smaller, while only 5% of the measured distance values are larger. In FIG. 17, the 95% quantile $z_q$ is marked; wherein those bars of the histogram corresponding to the smaller distance values are also highlighted by hatching. The value of the quantile may be determined from a given histogram using algorithms known per se.

With a quantile filter, a realistic value for the distance a2 to the surface 91 of the workpiece 24 may also be determined. z is to be considered here. For example, a 5% quantile filtering applied to the left half of the histogram in FIG. 17 is used. In this procedure, the risk that the determined value does not correspond to the actual value, however, is relatively large. The reason for this is that the number of distance values relating to the distance a2 is often much smaller than the number of distance values detected for the distance a1. Then, when the number of distance values for the distance a2 varies because the reflectance of the surface 91 fluctuates (due to, for example, surface contamination of the surface 91), these variations immediately noticeably affect the value of the quantile. The same applies to variations in the number of distance values caused by interferences or reflections from the vapor capillary 88. Because of the comparatively small number of values for the distance a2, variations of the interference level also have a comparatively strong effect on the value of the quantile.

In many cases, it is therefore better to use a distance value in the interval with the greatest frequency as the actual value for the distance a2, starting from the histogram shown in FIG. 17. The maximum 142 falls in this interval in the histogram of FIG. 17. An average obtained from all distance values in this interval may then be determined, for example, as a distance value. Furthermore, it is also possible to include the distance values from a predetermined number of neighboring intervals in the averaging.

ii) Other Filters

Instead of the quantile filter, other filters may also be used to derive the distances a1 and a2 from the measured distance values. In particular, it is possible to derive a distribution function with certain distribution parameters from the histogram according to FIG. 17 with the aid of a curve fit. In FIG. 17, such a distribution function is shown with a dashed line and designated 144. Values for the actual distances a1, a2 may then be derived from the parameters of the distribution function. The distances a1, a2 need not necessarily correspond to the maxima of the distribution functions. For example, beta distribution (with 0, $\beta<1$) and the Johnson-SU distribution are suitable as distribution functions.

Often it will be useful not to fit the entire histogram, but only the two halves of the histogram, wherein each contains one of the maxima 140, 142 with a distribution function. The distribution functions include, in particular, the following functions: Gaussian distribution, Poisson distribution, gamma distribution, Chi-square distribution, Lognormal distribution and Pearson distribution.

It has been found that it may be better not to use the same filter for the distances a1, a2, but different filters. Thus, experiments have shown in many cases that a quantile filter provides particularly good results for the distance a1 to the bottom of the vapor capillary 88. For the distance a1 to the surface 91 of the workpiece 24, however, it may be more appropriate to derive it from the parameters of a fitted distribution function.

4. Result

Figure 18A:
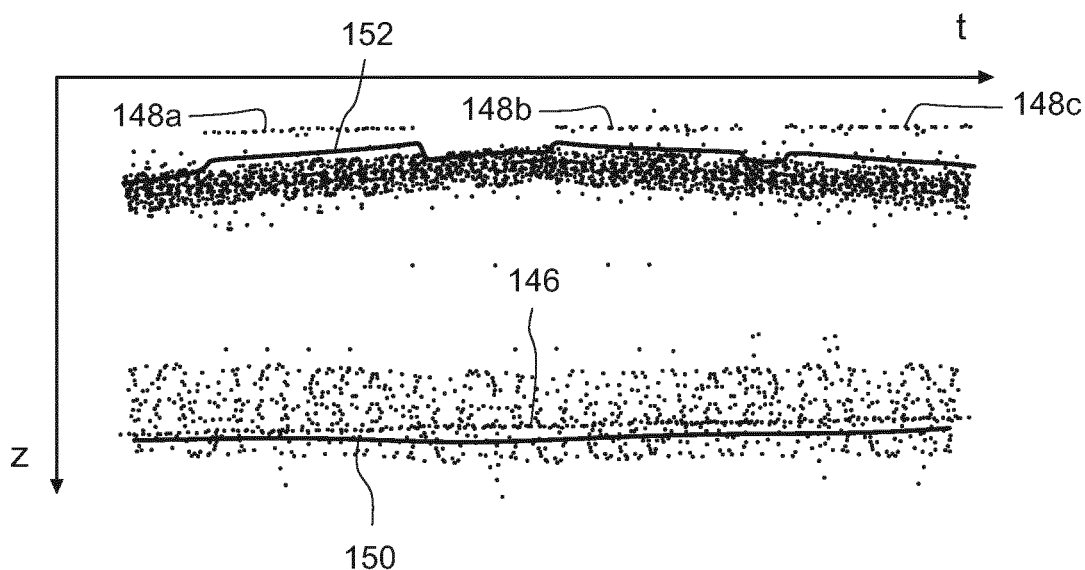
FIGS. 18a and 18b show graphs in which distance values obtained from disturbed and undisturbed, respectively, spectra and distances calculated by quantile filtering, are plotted over time t.

FIG. 18a shows a diagram in which, similarly to FIG. 7, the values for the distance z obtained by the Fourier transform from the interference spectra are plotted over the time t. It was assumed here that disturbances in the spectra were not removed, as explained in Sections 3 and 4. An artifact 146 may therefore be seen in the diagram, which lies on an approximately horizontal line and is in the vicinity of the distance values, which are evaluated for the determination of the distance a1.

In addition, several artifacts 148a, 148b, and 148c are in the vicinity of the distance values that are evaluated for the determination of the distance a2. These artifacts 148a, 148b and 148c are also approximately on a horizontal line but are temporally interrupted.

The solid lines 150 and 152 show the distances a1 and a2, respectively, which correspond to the 95% and 5% quantiles, respectively, as explained above in section 4a). The artifact 146 appears to increase the values for the distance a1. The intermittent artifacts 148a, 148b, and 148c cause jumps in the values for the distance a2, although the surface 91 is flat except for a mid-point kink.

Figure 18B:
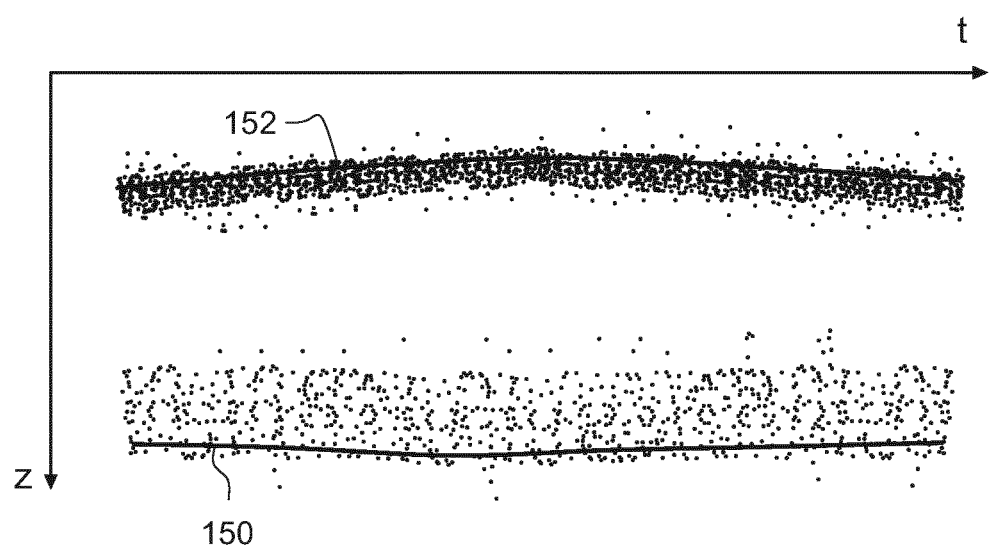

FIG. 18b shows a diagram corresponding to FIG. 18a, except that the undisturbed interference spectra, not the disturbed spectra, were evaluated here. The artifacts 146 and 148a, 148b, 148c are no longer present. Accordingly, the distances a1 are slightly lower, which is closer to reality, and the distances a2 no longer show any apparent jumps, but correctly reflect the shape of the surface 91.

The invention claimed is:

1. Method of measuring a depth of a vapor capillary during a high energy beam machining process, wherein the method comprises the steps of:
   a) directing an optical measuring beam to the bottom of the vapor capillary, which arises in an area of interaction between a workpiece and a high energy beam;
   b) detecting reflections of the measuring beam in an optical coherence tomograph;
   c) generating raw measurement data from the reflections detected in the optical coherence tomograph;
   d) repeating the steps a) to c) at several times $t_i$, where i=1, 2, 3, . . . , during the machining process, wherein a set of raw measurement data for a first distance (a1) to the bottom of the vapor capillary is obtained for each time $t_i$;
   e) calculating a set of undisturbed measurement data for a time $t_n$ by commonly processing in a mathematical operation a first set of raw measurement data generated at the time $t_n$ and a second set of raw measurement data generated at an earlier time $t_m$, where m<n;
   f) calculating a final value for the first distance (a1) at time $t_n$ from the set of undisturbed measurement data calculated in step e);
   g) measuring a second distance (a2) to a portion of the surface of the workpiece that is not exposed to the high energy beam; and
   h) calculating the depth of the vapor capillary by subtracting the second distance (a2) from the final value for the first distance (a1) calculated in step f).

2. Method according to claim 1, wherein, with the mathematical operation in step e), the set of raw measurement data generated at the earlier time $t_m$ is at least partially subtracted from the quantity of raw measurement data generated at time $t_n$.

3. Method according to claim 2, wherein at least part of the set of raw measurement data generated at an immediately preceding time $t_{n-1}$ is subtracted from the quantity of raw measurement data generated at time $t_n$.

4. Method according to claim 2, wherein, through the mathematical operation in step e), the set of raw measurement data generated at the earlier time $t_m$ was completely subtracted from the set of raw measurement data generated at time $t_n$.

5. Method according to claim 1, wherein, through the mathematical operation in step e), a moving average is at least partially subtracted from the set of raw measurement data generated at time $t_n$, which is calculated from sets of raw measurement data which were generated at several earlier times $t_j$, where j≤m.

6. Method according to claim 5, wherein the moving average is a weighted average having at least the order 2.

7. Method according to claim 5, wherein the moving average is an exponentially smoothed average.

8. Method according to claim 1, wherein the optical coherence tomograph is a spectral domain coherence tomograph, and wherein each set of raw measurement data represents an interference spectrum, which is generated by the optical coherence tomograph.

9. Method according to claim 8, wherein, through the mathematical operation in step e), the interference spectrum generated at the time $t_n$ is divided by an averaged spectrum representing an average of a plurality of interference spectra which were generated at earlier times $t_j$, where j≤m.

10. Method according to claim 9, wherein the interference spectra of 50 to 200 earlier time points contribute to the moving average.

11. Method according to claim 8, wherein a plurality of distance values is derived from the interference spectrums by Fourier transform, and wherein the final value for the first distance (a1) at time $t_n$ is calculated from the distance values according to a predetermined criterion.

12. Method according to claim 11, wherein the criterion is a quantile criterion.

13. Method according to claim 1, wherein in step g) the second distance (a2) is measured by a further measuring beam on the part of the surface of the workpiece that is not exposed to the high-energy beam, wherein reflections are detected by the other measuring beam in the same or another coherence tomograph, and wherein they are derived from the reflections of the distance values of the other measuring beam from which an final value for the second distance (a2) according to a predetermined criterion is calculated at time $t_n$.

14. Method according to claim 13, wherein an original measuring beam is divided into the measuring beam and the further measuring beam with the aid of a beam splitter.

15. Apparatus for measuring a depth of a vapor capillary during a high energy beam machining process, wherein the apparatus comprises:
   an optical coherence tomograph configured to perform the following steps:
      a) directing an optical measuring beam to the bottom of the vapor capillary formed in an area of interaction between a workpiece and a high energy beam;
      b) detecting reflections of the measuring beam in the optical coherence tomograph;
      c) generating raw measurement data from the reflections detected in the optical coherence tomograph; and
      d) repeating steps a) to c) at several times $t_i$, where i=1, 2, 3, . . . , during the machining process, wherein a set of raw measurement data for a first distance (a1) to the bottom of the vapor capillary is obtained for each time $t_i$, and
   an evaluation device, which is configured to carry out the following steps:
      e) calculating a set of undisturbed measurement data for a time $t_n$ by commonly processing in a mathematical operation a first set of raw measurement data generated at the time $t_n$ and a second set of raw measurement data generated at an earlier time $t_m$, where m<n;
      f) calculating a final value for the first distance (a1) at time $t_n$ from the set of undisturbed measurement data calculated in step e); and
      g) calculating the depth of the vapor capillary wherein a measured second distance (a2) to a portion of the surface of the workpiece that is not exposed to the high energy beam is subtracted from the final value for the first distance (a1) calculated in step f).

16. Apparatus according to claim 15, wherein, with the mathematical operation in step f), the set of raw measurement data generated at the earlier time $t_m$ is at least partially subtracted from the quantity of raw measurement data generated at time $t_n$.

17. Apparatus according to claim 15, wherein, through the mathematical operation in step f), a moving average is at least partially subtracted from the set of raw measurement data generated at time $t_n$, which is calculated from sets of raw measurement data which were generated at several earlier times $t_j$, where j≤m.

18. Apparatus according to claim 15, wherein the optical coherence tomograph is a spectral domain coherence tomograph, and wherein each set of raw measurement data represents an interference spectrum, which is generated by the optical coherence tomograph.

19. Apparatus according to claim 15, in step h) the second distance (a2) is measured by a further measuring beam on the part of the surface of the workpiece that is not exposed to the high-energy beam, wherein reflections are detected by the other measuring beam in the same or another coherence tomograph, and wherein they are derived from the reflections of the distance values of the other measuring beam from which a final value for the second distance (a2) according to a predetermined criterion is calculated at time $t_n$.

20. Apparatus for measuring a depth of a vapor capillary during a high energy beam machining process, wherein the apparatus comprises:
  a spectral domain optical coherence tomograph configured to perform the following steps:
    a) directing an optical measuring beam to the bottom of the vapor capillary formed in an area of interaction between a workpiece and the high energy beam;
    b) detecting reflections of the measuring beam in the spectral domain optical coherence tomograph;
    c) generating raw measurement data from the reflections detected in the spectral domain optical coherence tomograph; and
    d) repeating steps a) to c) at several times $t_i$, where i=1, 2, 3, . . . , during the machining process, wherein a set of raw measurement data for a first distance (a1) to the bottom of the vapor capillary is obtained for each time $t_i$, wherein each set of raw measurement data represents an interference spectrum, which is generated by the spectral domain optical coherence tomograph, and
  an evaluation device, which is configured to carry out the following steps:
    e) calculating a set of undisturbed measurement data for a time $t_n$ by commonly processing in a mathematical operation a first set of raw measurement data generated at the time $t_n$ and a second set of raw measurement data generated at an earlier time $t_m$, where m<n, wherein in the mathematical operation the interference spectrum generated at the time $t_n$ is divided by an averaged spectrum representing an average of a plurality of interference spectra which were generated at earlier times $t_j$, where j≤m;
    f) calculating a final value for the first distance (a1) at time $t_n$ from the set of undisturbed measurement data calculated in step e); and
    g) calculating the depth of the vapor capillary wherein a measured second distance (a2) to a portion of the surface of the workpiece that is not exposed to the high energy beam is subtracted from the final value for the first distance (a1) calculated in step f).

* * * * *